US012287821B2

United States Patent
Lauber

(10) Patent No.: US 12,287,821 B2
(45) Date of Patent: Apr. 29, 2025

(54) SYSTEMS AND METHODS FOR CONTEXTUAL CLUSTERING

(71) Applicant: Nice Ltd., Ra'anana (IL)

(72) Inventor: Stephen Lauber, Raanana (IL)

(73) Assignee: Nice Ltd., Ra'anana (IL)

( * ) Notice: Subject to any disclaimer, the term of this patent is extended or adjusted under 35 U.S.C. 154(b) by 0 days.

(21) Appl. No.: 18/460,803

(22) Filed: Sep. 5, 2023

(65) Prior Publication Data
US 2025/0077564 A1   Mar. 6, 2025

(51) Int. Cl.
*G06F 16/30*   (2019.01)
*G06F 16/3329*   (2025.01)
*G06F 16/355*   (2025.01)

(52) U.S. Cl.
CPC ........ *G06F 16/355* (2019.01); *G06F 16/3329* (2019.01)

(58) Field of Classification Search
None
See application file for complete search history.

(56) References Cited

U.S. PATENT DOCUMENTS

| 10,970,493 | B1 | 4/2021 | Lee | |
|---|---|---|---|---|
| 2002/0169770 | A1* | 11/2002 | Kim | G06F 16/355 707/999.005 |
| 2004/0260551 | A1 | 12/2004 | Atkin | |
| 2005/0033750 | A1 | 2/2005 | Cobb | |
| 2006/0026152 | A1 | 2/2006 | Zeng et al. | |
| 2009/0112881 | A1* | 4/2009 | Kodama | G06F 16/176 |
| 2010/0049708 | A1* | 2/2010 | Kawai | G06F 16/355 707/E17.014 |

(Continued)

FOREIGN PATENT DOCUMENTS

WO   WO 2017180475   10/2017

OTHER PUBLICATIONS

Carrion et al., "A taxonomy generation tool for semantic visual analysis of large corpus of documents", Jul. 2019.

(Continued)

*Primary Examiner* — Jau Shya Meng
(74) *Attorney, Agent, or Firm* — PEARL COHEN ZEDEK LATZER BARATZ LLP

(57) ABSTRACT

A computerized system and method may provide automated clustering procedures where each clustered entity or node may be included in a plurality of clusters (e.g., more than a single cluster). Clustering procedures provided by some embodiments of the invention may involve measuring and/or quantifying degrees of relevance and/or generality for a plurality of entities or nodes. In some embodiments, a clustering procedure may be used, e.g., to generate a hierarchical, multi-tiered taxonomy of such entities. A computerized system comprising a processor, and a memory, may be used for ranking a plurality of nodes; select nodes based on the ranking; cluster selected nodes into intermediate clusters; calculate distances between unselected nodes and intermediate clusters; and cluster unselected nodes and intermediate clusters into final clusters based on the calculated distances. Some embodiments of the invention may allow routing interactions between remotely connected computer systems based on an automatically generated taxonomy.

20 Claims, 11 Drawing Sheets

(56) References Cited

U.S. PATENT DOCUMENTS

| | | | |
|---|---|---|---|
| 2016/0042053 | A1 | 2/2016 | De Sousa Webber |
| 2016/0359680 | A1* | 12/2016 | Parandehgheibi .... G06F 16/122 |
| 2018/0189307 | A1 | 7/2018 | Yu et al. |
| 2018/0308487 | A1 | 10/2018 | Goel et al. |
| 2019/0103104 | A1 | 4/2019 | Nicholls |
| 2019/0244603 | A1 | 8/2019 | Angkititrakul |
| 2020/0098366 | A1 | 3/2020 | Chakraborty |
| 2022/0100798 | A1 | 3/2022 | Donaldson |
| 2022/0108068 | A1 | 4/2022 | Datla |
| 2024/0012663 | A1* | 1/2024 | Yuan .................. G06F 8/61 |

OTHER PUBLICATIONS

Shen et al., "HiExpan: Task-Guided Taxonomy Construction by Hierarchical Tree Expansion, Association for Computing Machinery", Aug. 2018.

Pathirana et al., "Concept Discovery through Information Extraction in Restaurant Domain", Computación y Sistemas, vol. 23, No. 3, pp. 741-749, Apr. 2019.

Mihalcea et al., "Text Rank: Bringing Order into Texts", Department of Computer Science University of North Texas, Jul. 2004.

Quoc et al., "Distributed Representations of Sentences and Documents.", 2014, arXiv preprint arXiv:1405.4053v2.

Kusner et al., "From Word Embeddings to Document Distances.", Proceedings of the 32nd International Conference on Machine Learning., 2015, vol. 37, JMLR W&CP, Lille, France.

Kiros et al., "Skip-Thought Vectors.", 2015., arXiv preprint arXiv:1506.06726v1.

Hill et al., "Learning Distributed Representations of Sentences from Unlabelled Data.", 2016, arXiv preprint arXiv:1602.03483v1.

Arora et al., "A Simple but Tough-to-Beat Baseline for Sentence Embeddings", Conference Paper at ICLR, 2017.

Chen, Minmin., "Efficient Vector Representation for Documents Through Corruption.", 2017., arXiv preprint arXiv:1707.02377v1.

Pagliardini et al., "Unsupervised Learning of Sentence Embeddings using Compositional n-Gram Features.", 2018., arXiv preprint arXiv:1703.02507v3.

Levy et al., "Dependency-BasedWord Embeddings'.". Computer Science Department, Bar-Ilan University, Ramat-Gan, Israel, Jun. 2014.

Logeswaran et al., "An Efficient Framework for Learning Sentence Representations.", 2018., arXiv preprint arXiv:1803.02893v1.

* cited by examiner

SYSTEMS AND METHODS FOR CONTEXTUAL CLUSTERING

CROSS-REFERENCE TO RELATED APPLICATIONS

The present application claims the benefit of U.S. Provisional Patent Application No. 63/433,272, filed on Dec. 16, 2022, which is incorporated by reference herein in its entirety.

FIELD OF THE INVENTION

The invention relates generally to clustering-algorithm-based automatic generation of a taxonomy, for example from a constituting set of entities or words.

BACKGROUND OF THE INVENTION

Clustering and/or organizing entities, items, or terms according to various similarity or relatedness measures have countless applications in a variety of technological areas, such as for example the automatic, computer-based, generation of documents and text previously assumed to require human intelligence and/or intuition, artificial intelligence and neural network processing, and generally in the analysis of large amounts of documents using natural language processing (NLP) techniques. Current cluster analysis technology allows grouping terms according to a similarity measure or score, and, subsequently, labeling groups or clusters by a human user. However, there is a need for novel technology, protocols, and approaches that allow automatically organizing terms in more complex and informative structures in a robust manner.

SUMMARY OF THE INVENTION

Embodiments may automatically cluster a plurality of entities (which may be, e.g., words extracted from a plurality of documents) and enable an entity to belong to, or be included in, a plurality of clusters (e.g., more than a single cluster), for example based on measuring or quantifying degrees of similarity and/or relevance and/or generality for the entities or nodes.

Embodiments may generate taxonomies which may describe, for example, intricate semantic relationships between a plurality of terms placed in multiple tiers or categories of semantic hierarchy, providing a description of such intricate relationships.

A computerized system and method may rank a plurality of nodes, where each node includes, e.g., an entity or an initial cluster of entities; select nodes based on the ranking; cluster selected nodes into intermediate clusters; calculate distances between unselected nodes and intermediate clusters; and cluster unselected nodes and intermediate clusters into final clusters based on the calculated distances.

Some embodiments of the invention may automatically generate a domain taxonomy based on measuring and/or quantifying degrees of generality for entities within the domain under consideration. A computerized system comprising a processor, and a memory including a plurality of entities may be used for calculating generality scores for a plurality of input nodes (where nodes may include, for example, entities or clusters of entities), selecting exemplars based on the scores, and clustering unselected nodes under the exemplars to produce a multi-tiered, hierarchical taxonomy structure among nodes.

In some embodiments of the invention, entities may correspond to documents and/or text files and/or to words or terms extracted from such documents or text files.

Some embodiments of the invention may allow categorizing interactions among remotely connected computers using an automatically generated domain taxonomy, e.g., within a contact center environment. In this context, documents describing interactions between remotely connected computers may be considered as input entities, from which words may be extracted and clustered as described herein. Some embodiments may accordingly offer routing interactions between remotely connected computer systems based on an automatically generated taxonomy.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may automatically generate a hierarchical, multi-tiered taxonomy, for example, based on measuring and/or quantifying degrees of generality for a plurality of input entities—which may, be for example, a plurality of words extracted from a corpus of documents—as further described herein. In some embodiments, a computerized system comprising a processor, and a memory including a plurality of entities such as documents or text files, may be used for extracting words from a plurality of documents; calculating generality scores for the extracted words; selecting some of the extracted words to serve as exemplars based on the scores; and clustering unselected words under appropriate exemplars to produce or output a corresponding taxonomy. Some embodiments of the invention may further allow categorizing interactions among remotely connected computers using a domain taxonomy, and/or routing interactions between remotely connected computer systems based on the taxonomy as described herein.

Embodiments may allow performing a contextual clustering procedure or protocol where words or terms may be included in or grouped into more than one cluster, while having varying contexts within each cluster into which they are grouped. A computerized system comprising a processor and a memory may be used for ranking a plurality of nodes, where each node includes, e.g., an entity or an initial cluster of entities; selecting nodes based on the ranking; clustering selected nodes into intermediate clusters; calculating distances between unselected nodes and intermediate clusters; and clustering unselected nodes and intermediate clusters into final clusters based on the calculated distances.

Figure 1:
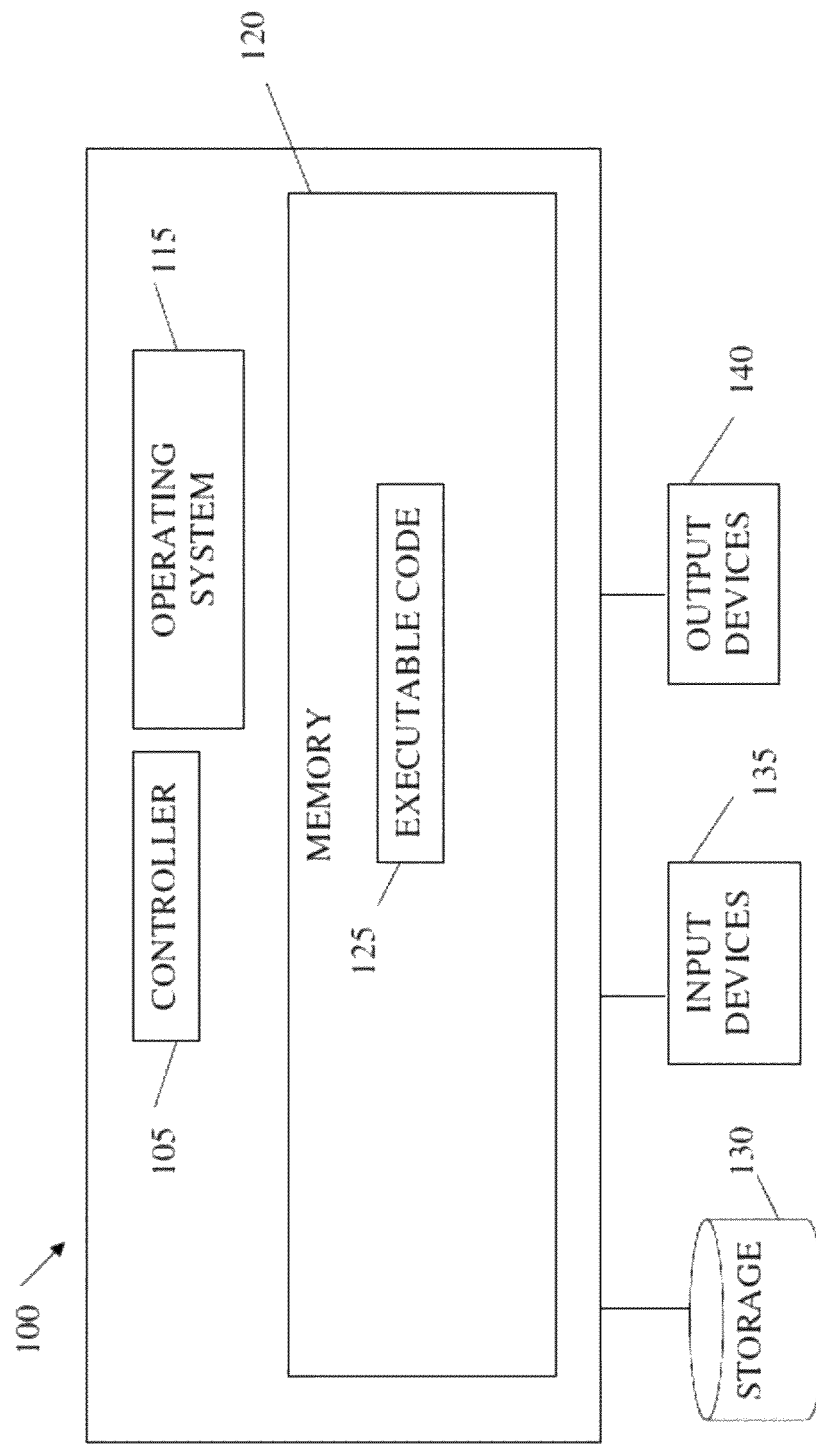
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications perform methods as disclosed herein, for example those of FIGS. 1-11, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as documents or interactions may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. Procedures and protocols described herein may thus be performed using a computer systems such as computing device 100, or, additionally or alternatively, using a plurality of remotely connected computer systems, such as for example one or more devices such as computer devices 100 connected over a communication network.

Embodiments of the invention may take as input a plurality of entities and consider them as nodes or points, and group or cluster a plurality of such nodes or points according to the principles and procedures outlined herein.

In some embodiments, entities considered as or included in nodes may be or may describe for example terms, words, or sentences which may be extracted from or identified within a set or corpus of documents (which may also be referred to as a "domain"). Term extraction may be performed based on various conditions or constraints, such as for example a combination of occurrence data, e.g. the number of times the term occurs in the set of documents, along with various filtering mechanisms. Embodiments of the invention may thus search and subsequently extract or retrieve a plurality of entities based on such conditions and/or criteria, filtering principles or mechanisms, as well as appropriate word extraction procedures known in the art.

In some embodiments, the words extracted may be used as training data for a vector embedding model (e.g. a Word2Vec process), which may be used to calculate or produce vector representations or embeddings to a plurality of entities considered by embodiments of the invention as further described herein.

It should generally be noted that while terms or words extracted from documents are used herein as a particular example for entities which may be taken as input by some embodiments of the invention-additional and/or alternative entities may be considered by different embodiments. Thus, entities such as terms of words should be considered merely as a non-limiting example. In this context, terms such as "nodes", "points", "entities", "words", and the like, may be used interchangeably throughout the present document.

A domain as referred to herein may be or may correspond to a dataset or repository from which entities may be extracted or identified. Thus, in some embodiments a domain may be, e.g., a corpus of documents from which a plurality of words or terms may be extracted.

A lexicon or domain lexicon as referred to herein may be or may include a set of entities such as terms, or words or other items which may for example be collected or extracted from a plurality of data items—such as a domain or corpus of text documents and/or files as described herein. A domain lexicon and may be organized in a dedicated data structure, such as a table or a JSON data object, and may include a corresponding plurality of attributes describing the entities (such as for example a number of occurrences of a given word in the data items based on which the domain was established). In some embodiments of the invention, a domain lexicon may be established to correspond to a particular domain based on input data items provided by or for that domain, such as data items received from or describing a given remote computer, or a plurality of remote computers (which may belong to or be associated with, for example, an organization or a plurality of organizations). A taxonomy, or domain taxonomy (when applied to a specific domain), as referred to herein may be or may include a multi-tiered, hierarchical structure of entities, items, terms, or words (e.g., extracted from and/or describing a domain), where similar terms are clustered or grouped together, and where terms move from general to specific across different levels of the hierarchical structure. Some example taxonomies are provided herein. However, one skilled in the art may recognize that additional or alternative particular forms and formats or taxonomies, including various levels of hierarchy among clustered of entities, may be used in different embodiments of the invention.

A vector embedding or representation as used herein may be or may describe for example an ordered list of values and/or numbers. A given term may, for example, have or be associated with a 5-dimensional vector with norm 1, for example [1.1, 2.1, 3.1, 4.1, 5.1]. Various vectors of different dimensionalities and value types (including, for example, binary "true/false" like values) may be used as part of vector representations or embeddings in different embodiments of the invention.

Vector embeddings or representations may be calculated for the entities considered by some embodiments of the invention. For example, a Word2Vec model, or another suitable model or procedure, may be used to produce for each entity an embedding or vector representation (e.g. in a metric space). In some embodiments, each unique entity such as a term or cluster (such as for example a cluster of words) may be assigned a corresponding unique vector. Various vector embedding models which may be used to generate vectors representations or embeddings for entities and/or words are known in the art.

Given a lexicon including a plurality of underlying entities or a term "vocabulary" (which may include, for example, multi-word terms, as well as individual words) and suitable vector embeddings or representations of these terms, e.g., in a metric space-embodiments of the invention may use various clustering algorithms to cluster or group relevant terms according to their semantic similarity, which may prove useful, for example, for constructing a taxonomy. For example, the known k-means algorithm or another suitable algorithm may be applied to the associated vector embeddings or representations, for example together with additional constraints and conditions (e.g., specifying a number of final clusters) as disclosed herein. Alternative clustering algorithms and procedures, or a plurality of such procedures, may be used in different embodiments of the invention.

For a given entity such as a word, term, node, or a cluster formed of constituent entities (e.g., following a given clustering iteration) embodiments or the invention may calculate a vector representation or embedding for that entity based on its various properties or attributes. Some example properties or attributes for entities which may be used in this context are further discussed herein (e.g., generality and/or relevance scores), but alternative or additional attributes may be used in different embodiments. In the case of a cluster (such as, e.g., a cluster of words), such a representation may, e.g., be defined as equal to the centroid of the cluster, or the centroid of the constituent term vectors, which may for example be calculated as the mean or average of these vectors—although other procedures for calculating a cluster vector may be used in different embodiments of the invention. Based on the vectors or embeddings generated, embodiments of the invention may determine whether entities or clusters should be further linked, grouped, or clustered together.

To determine if entities or clusters of entities may be clustered or linked, embodiments may compare a pair of embeddings or representations—in some embodiments this comparison or measure may be termed or referred to as a distance. For example, some embodiments may use or include the cosine similarity measure as a distance measure, which may indicate similarity between two non-zero vector representations or embeddings $S_1$ and $S_2$ using the cosine of the angle between them:

$$\text{sim}(S_1, S_2) = \frac{S_1 \cdot S_2}{\|S_1\| \cdot \|S_2\|} \quad \text{(eq. 1)}$$

Eq. 1 may output scores between 0.00 (no similarity) and 1.00 (full similarity or identity). Embodiments of the invention may calculate similarity scores and link or group two entities if, for example, a similarity score exceeding a predetermined threshold (such as for example sim $(S_1, S_2)$ ≥0.70) is calculated based on the corresponding vector representations or embeddings. Some embodiments may store calculated similarity scores in an affinity matrix as further described herein. Additional or alternative measures and/or formulas of similarity may be used in different embodiments of the invention.

In some embodiments of the invention, a connectivity matrix may be calculated or, e.g., derived or transformed from an affinity or similarity matrix, which may contain pairwise similarity scores (as may calculated by some embodiments of the invention, e.g., using Eq. 1 herein—see also further discussion herein) between pairs of the words, entities, or clusters input into the clustering procedure. Connectivity matrices may be used to identify, for example, the KNNs of each point whose similarity score to another, given point is below a predetermined threshold or within a specific distance or interval.

Some embodiments of the invention may use, e.g., weighted statistical parameters, attributes, or characteristics of the similarity matrix in transforming an affinity matrix into a connectivity matrix. For example, an embodiment may use a threshold of $T=\mu+k\cdot\sigma$—where u is the mean and $\sigma$ is the standard deviation of similarity values in the affinity matrix, and k is an additional parameter or weight (which may, e.g., be set to equal unity)—as a connectivity determining criterion (see also example affinity and connectivity matrices in Tables 1-2). In one example, a point may be clustered with another point or added to a cluster if a similarity score higher than T is calculated based on the vectors representations for the point(s) and/or the cluster (which may be based, e.g., on the centroid of the cluster as noted herein). In some embodiments, k may be set to a negative value, e.g., in case the forming of looser clusters, and an accordingly lower clustering threshold, are desirable.

Example affinity and connectivity matrices for three words {W1, W2, W3} may be seen in Tables 1-2, respectively.

TABLE 1

| $T = 0.5 + 1.2(0.2) = 0.74$ | W1 | W2 | W3 |
|---|---|---|---|
| W1 | 1.00 | 0.30 | 0.75 |
| W2 | 0.30 | 1.00 | 0.30 |
| W3 | 0.75 | 0.30 | 1.00 |

Given $\mu=0.5$, $k=1.2$, and $\sigma=0.2$, a connectivity threshold may be calculated as $T=\mu+k\cdot\sigma=0.74$. An additional constraint may be added in some embodiments of the invention, which may require a similarity score smaller than 1.00 for connectivity (as a similarity score of 1.00 may only describe the similarity of an entity to itself). Thus, in an affinity matrix such as described by Table 1, words W1 and W3, for which a pairwise similarity score of 0.75 is calculated, may be considered connected (thus marked in bold text), while words W1 and W2, as well as W2 and W3, may be considered unconnected. An affinity matrix such as, e.g., the one shown in Table 1 may be converted or transformed into a connectivity matrix, for example, by setting similarity scores satisfying connectivity conditions and/or criteria to 1, and remaining ones to 0, as shown in Table 2.

TABLE 2

|  | W1 | W2 | W3 |
|---|---|---|---|
| W1 | 0 | 0 | 1 |
| W2 | 0 | 0 | 0 |
| W3 | 1 | 0 | 0 |

Alternative procedures for calculating similarity and/or connectivity matrices may be used in different embodiments of the invention.

Some embodiments of the invention may include or involve additional conditions or criteria that may be applied to similarity scores or measures, or distance measures, such as for example finding and using the kth most similar vector to set a similarity threshold such that vectors or embeddings found less similar than that threshold may not be linked to a given entity or cluster (see also further discussion regarding "soft clustering" herein). Other types of thresholds may be used in different embodiments. Different thresholds may be adaptive in the sense that it may be tuned, for example in the beginning of a given clustering iteration, according to various performance considerations. For example, a similarity threshold may be tuned such that each entity is connected to no less than one and no more than three other entities at each clustering iteration. Other ranges or tuning or adaptiveness thresholds and measures may be used in different embodiments of the invention.

In this context, one skilled in the art would generally recognize that different formulas and/or measures for similarity or distance, as well as conditions and/or criteria may be included or combined with the different schemas, procedures and/or protocols described herein to produce or provide different embodiments of the invention.

Figure 2:
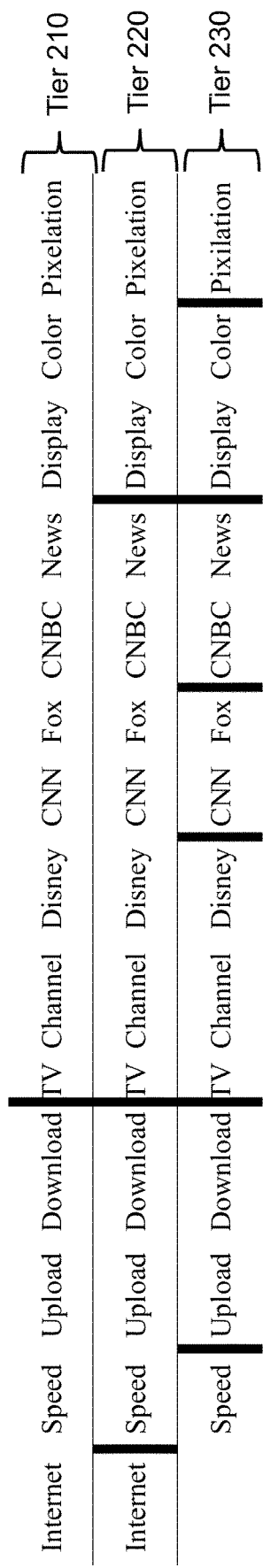
FIG. 2 depicts an example hierarchical-clustering-based organization of words that may be produced by embodiments of the invention applying previous methods and approaches.

FIG. 2 depicts an example hierarchical-clustering-based organization of words that may be produced by some embodiments of the invention. Embodiments employing or utilizing the so-called Hierarchical Clustering algorithm (or HC) may produce various artifacts such as the 'hierarchy' of clusters as in levels or tiers 210, 220, and 230 in FIG. 2, where thick lines denote the separation between clusters in a given level among the three levels depicted, and where subsequent levels or tiers (starting from the highest level 210) describe smaller (mid-level, 220) and smaller (lower level, 230) sub-clusters for each cluster found in the preceding level. Since HC is based merely on semantic similarity as measured by, e.g., word embedding distances (themselves typically largely dependent on the dataset used for the training of a corresponding Word-2-Vec model), a resulting grouping using such algorithm may not distinguish between general and specific terms-grouping, for example, "CNBC" (specific) with "News" (more general), while on the other hand, grouping "CNN" with "Fox" (both equally specific) as in the in lower tier 230. Additionally, as may be seen in the middle tier 220, the general word "TV" was placed in (what a human being may identify, looking from the outside, as) the "TV Channels" group which includes "Channel", "Disney", "CNN", "Fox", "CNBC", and "News"-despite the equally legitimate claim of the "TV Display" group including "Display", "Color", and "Pixelation" (which may indicate, for example, that in the training set, the words 'TV' and 'Channel' co-occurred more frequently than 'TV' and 'Display').

Despite managing to group the input set of terms, HC does not provide, on its own, any names or labels for the resulting groups or cluster (even for top tier 210, where a subjective' human interpretation based division between, e.g., "Internet-related" words and "TV-related" words may seem unambiguous). Providing such labels or names may thus require manual intervention by a human user, which may become, in many cases, an undesirable performance bottleneck (in addition to involving various subjective biases and corresponding errors). Another common shortcoming or drawback from which previous clustering approaches (such as, e.g., HC) often suffer is the requirement to manually specify the desired number of output clusters as input to the clustering procedure. Having limited a priori information regarding a given domain lexicon, specifying or assigning such value may not be a trivial task, and offering a semantically meaningful clustering output for essentially different input datasets, or corpuses of documents, would be difficult to achieve.

Some embodiments of the invention may thus improve prior technology by allowing automatically hierarchically clustering, grouping, or generally categorizing or organizing a group of nodes under particular node or "topic" which describes or summarizes them. In some embodiments, a topic (otherwise referred to as "exemplar", or cluster title herein) may be considered a subject relating and/or representing and/or describing the plurality of underlying terms.

Figure 3:
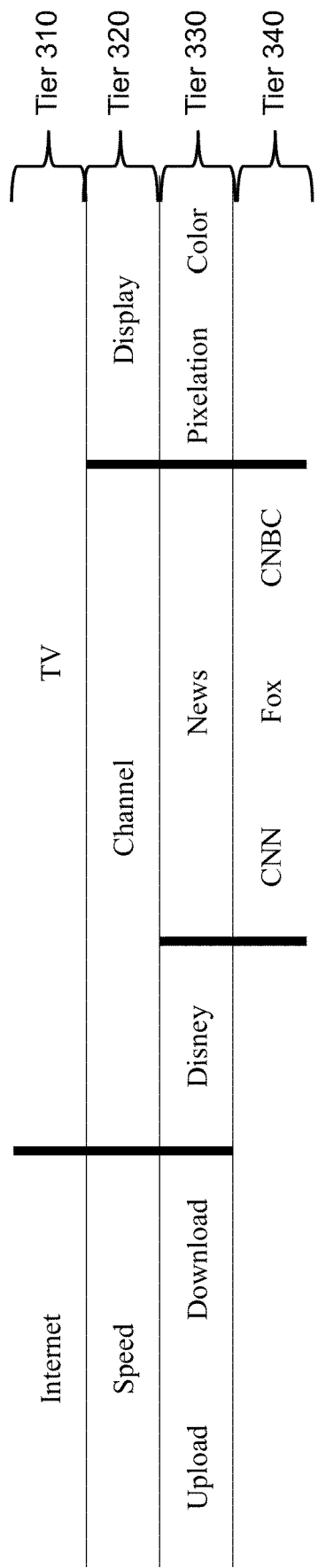
FIG. 3 is a graphical representation of an example automatically generated, hierarchical domain taxonomy that may be generated using some embodiments of the invention.

FIG. 3 is a graphical representation of an example automatically generated, hierarchical domain taxonomy that may be generated using some embodiments of the invention. By requiring as in some embodiments words to go from general to specific, which may be achieved according to the various methods and procedures described herein, not only are the groups or clusters at each of tiers 310, 320, 330, and 340 more homogenous (e.g., with respect to their level of generality/specificity) and well distinguished from one another compared to, e.g., clustering results described in tiers 210, 220, 230 in FIG. 2—but, in addition, terms at each tier may, for example, automatically be used as a label for the terms underneath them. For example, it can be seen that terms included in tier 310 ("Internet", "TV") may serve as labels or titles to term included in tier 320 ("Speed" under "Internet"; "Channel" and "Display" under "TV"), and that similar hierarchies are satisfied among subsequent, lower tiers 330, 340. A taxonomy produced or provided by some embodiments of the invention may thus include hierarchical, tiered structures such as for example illustrated in FIG. 3.

Embodiments may calculate a plurality of scores or grades which may for example describe various relationships between the different entities and/or clusters considered, and which be used as part of different clustering operations and procedures (e.g., in order to produce a taxonomy such as that depicted in FIG. 3). For example, embodiments may calculate or measure entity, node, or cluster generality and/or relevance scores, ranks, indicators or indices, according to the principles and formulas provided herein, for example in order to select cluster titles or exemplars. In this context, some embodiments of the invention may calculate or measure entity, node, or cluster generality scores and related indices according to the principles and formulas provided herein.

One informative indicator for calculating or measuring, for example, word generality in a given corpus of documents may be the number of separate documents in which a given word occurs. One example document is a contact center interaction. Such an indicator may generally be considered as the frequency of occurrence of an entity (such as, e.g., a word) in a plurality of data or information items (which may be, e.g., documents). Thus, a document frequency (DF) index, may be, e.g., calculated as the counting of documents including the word (or, e.g., a logarithm of this number or value) by embodiments of the invention given an input domain or corpus of documents. DF may be considered an informative measure in addition to, or separately from the total word frequency. While more general or abstract terms may appear across a large number of documents, they might not appear as frequently within any individual document. For example, in a document or file which may describe, e.g., an interaction between remote computers, or between humans operating remote computing systems, such as a caller and a contact center agent, some more specific or concrete words may dominate as the conversation develops and becomes more detailed in nature (and may revolve, e.g., around a specific technical issue described by corresponding terms, such as "cellular network", "download speed", and the like-compared to less-specific words such as "internet"). Thus, in some embodiments, DF may be calculated, e.g., based on parts of the documents considered, and/or on the frequency of occurrence in a given document—for example by omitting the first n lines (which may be, in some cases, associated with less-informative contents), or by not considering terms appearing less than n times within the document. Additional or alternative conditions or criteria for calculating a frequency of occurrence or DF indices may be used in different embodiments of the invention.

Another indicator may be established based on the idea that the more "general" an entity such a word may be—the more contexts in which it may occur, and hence the more co-words or joint-entities it may have. A co-word may be defined and/or identified as a word which occurs in the same grammatical phrase as the word under consideration, and/or found within a predetermined distance (such as, e.g., separated by at most 5 words within a sentence) from that word. For example, 'channel' would be a co-word of 'TV' since they frequently occur together in multi-word phrases such as 'TV channel', 'I changed channels on the TV', etc. Similar or equivalent general definitions may be formulated and used for non-word entities and joint entities (such as for example, based on a distance or similarity of a given entity and/or its attributes within a database or repository may be from those of other entities and/or their attributes within the same repository or database). Co-words may generally be identified in cases where they are linked to a given word by a dependency parser, where various such dependency parsers may be defined or used in different embodiments of the invention (and may include, for example, '-', 'on the', and 'with the', as well as more broad or abstract grammatical relationships such as subject-object and the like, for example, based on various grammatical standards for subjecthood such as nominal subjecthood or nsubj, and the like). More generally, co-words may be considered a particular kind of joint-entities for a given entity—that is entities that appear in conjunction to that particular entity (for example, joint entities may be defined and/or identified by being included in at least a minimum number or percentage of data or information items which also include the entity under consideration—although other definition may be used). In some embodiments of the invention, a joint-entity index such as for example a co-word count (CWC) index, which may for example a logarithm of the number of different or distinct co-words found for a given word within a set of documents, may be calculated. The calculated CWC index for a given entity or word may be compared to a predetermined threshold of minimum co-words. Such threshold may reflect the minimum co-occurrence threshold for a word to be considered 'general' by embodiments of the invention. In some embodiments, a "sliding window", e.g., of pre-defined length may be used to define or capture co-words found before or after a given word—for example without requiring a particular dependency parser. Additional or alternative conditions or criteria for capturing co-words or joint entities and calculating CWC or joint-entity index may be used in different embodiments of the invention.

A joint-entity-spread or a co-word spread (CWS) index may follow on from the CWC index but go a step further in that in addition to the number of co-words or different co-words that may be relevant for capturing the generality of a word appearing in multiple contexts, the diversity of these contexts may be taken into account based on, e.g., calculating how semantically 'spread out' different co-words found for a given word are. More generally, a joint-entity-spread index may be based on a distance or dissimilarity of each joint-entity from the given entity. For example, in the case there is a certain word with a large number of tightly knit co-words, and there is a second word, having the same number of co-words, but the latter being more varied and diverse. The latter word may accordingly be considered more general. To measure or calculate the co-word spread for a given word w, the mean similarity of the word's vector embedding from the respective vector embeddings of each of its co-words $x_i$ (i=1, 2, . . . n) may be calculated by embodiments of the invention as, for example:

$$CWS = \frac{\sum Sim(w, x_i)}{n}; x_{i=(1,2,\ldots,n)} \in co\_words(w) \quad (eq. 2)$$

Where Sim may for example be defined as in example Eq. 1. Additional or alternative similarly measures and formulas for calculating joint-entity spread or CWS indices may be used in different embodiments of the invention.

Another measure for the generality of a word may involve, given a certain multi-word phrase, finding a primary or 'head' word with respect to which other word(s) are secondary or ancillary. For example, in the phrase 'TV channel', one may intuitively recognize that 'TV' is the headword-informing a general subject or domain—while 'channel' is the particular aspect of that domain being focused on. A relative weighted frequency of occurrence or relative DF (RDF) score or index of an entity or word based on, or with respect to, the (average) DF scores of its joint entities or co-words may be used as a measure for such characteristic or attribute by embodiments of the invention. In some embodiments, the RDF of a word i may, for example, be defined and calculated as, for example:

$$RDF = \log(DFi) / \left( \frac{\sum \log(DFj)}{n} \right); j \in co\_words(i) \quad (eq. 3)$$

In some embodiments, a variant may include the average of the $DF_j$s—weighted by their respective co-occurrence frequencies with i, although additional or alternative variants may also be used. A high relative DF score (e.g., above a predetermined threshold) may indicate that, at least in the contexts in which it appears, a given word may be the head word and hence of a more general nature than its co-words. The generality of a word may accordingly still be recognized despite having a relatively low global DF value or score.

Some or all of the above indices, factors or components may be used and/or combined to obtain an overall generality index or score for a given word, which may be calculated by various embodiments of the invention. Since the outputs of each of the above calculations may be of a different scale, some embodiments may include normalizing the values or scores for each category across the domain vocabulary—for example, by or based on dividing each one by the maximum calculated value for that index category, resulting in values between 0 and 1, relative to that maximum value. An overall word generality index (WGI), which may be used as a generality score, for a given word w may thus be defined and calculated by embodiments of the invention, for example, according to the following example equation:

$$WGI_w = \alpha(DF_w) \cdot \beta(RDF_w) \cdot \gamma(CWC_w) \cdot \delta(CWS_w) \quad (eq. 4)$$

where $\alpha$, $\beta$, $\gamma$, $\delta$ may be coefficients or weights that may be assigned to each of the scores or values considered herein, which may be included in the WGI calculated by some embodiments of the invention. In some embodiments, all weights may be equal by default (e.g., set to 1). Additional or alternative normalization or weighting may be included in different embodiments of the invention.

Embodiments of the invention may cluster a plurality of entities (such as words and terms extracted from or identified within a plurality of documents as described herein) according to generality and/or relevance scores, indices or metrics as described herein. For example, generality and/or relevance scores (such as for example WGIs and/or scores calculated or measured, e.g., using the graph-based TextRank procedure or algorithm, or based on additional or alternative appropriate ranking algorithm or protocol), may be considered or incorporated as a priori conditions or preferences into various clustering and/or grouping protocols and procedures, e.g., to enable selecting 'exemplars', or cluster titles, as part of the clustering of entities into a multi-tiered taxonomy.

In some embodiments of the invention, which may include or involve clustering approaches and techniques such as, e.g., Affinity Propagation (AP), words may be selected from the original set (e.g., through an iterative process) to serve as exemplars or representatives for other words (such that exemplars may for example be used as cluster labels, topics or titles for the latter words). As part of such procedure, some embodiments may, for example, select the exemplars or cluster title or label and/or perform clustering operations, e.g., based on an affinity matrix as described herein. Following the selection of exemplars for a given set or cluster of nodes, embodiments of the invention may group or cluster a plurality of remaining, unselected nodes under the selected exemplar or exemplars, and for example iteratively repeat various steps included in the clustering procedure to automatically generate a domain taxonomy, e.g., as further described herein.

In other embodiments, a priori input preferences or predefined constraints (including, for example, various upper/lower threshold values for calculated indices that may be applied such that, e.g., if an index calculated for a given word is below a predetermined threshold-then it may be set to zero), may be combined or integrated into a clustering method or algorithm such as for example the AP algorithm. Thus, exemplars selected as part of a clustering algorithm or procedure (e.g., when a clustering algorithm hits a stop block, and/or upon convergence of an iterative process, e.g., until appropriate convergence criteria are met, as known in the art), may be 'representative' of the other cluster members, taking into account not only their similarities to the other cluster members or affinity matrix values, but also the a priori preferences supplied as input such as for example some or all of the above word generality measures or metrics.

For example, based on WGI scores input to a clustering algorithm or procedure as a priori preferences or preconditions, more 'general' words (e.g., for which WGI above a threshold of 0.8 were calculated) may be chosen or selected cluster exemplars per clustering iteration. Such precondition may lead to clustering results possessing some of the desired characteristics of a taxonomy discussed herein. In another example, clusters or pairs of nodes of less general words (e.g., for which WGI scores below a threshold of 0.3 were calculated) may not be merged with clusters or pairs of nodes containing more general words (e.g., WGI>0.5) in a given clustering iteration. Additional examples may be based on, e.g., RDF scores indicating that less frequent words (e.g., characterized by DF<30 and RDF>5; or, e.g., DF<0.8 and RDF>0.7 in a case where scores may be normalized with respect to other cluster members as demonstrated herein in the context of probabilistic selection of exemplars) are, in fact, more general than their more frequent counterparts (e.g., DF>30 and RDF<1; or, e.g., DF>0.8 and RDF<0.2 when normalized scores are considered). Thus, less frequent words may be chosen as exemplars based on a priori conditions incorporating such RDF scores.

In some embodiments of the invention, WGIs may be used in various clustering iterations, e.g., as part of calculating or recalculating a centroid or contextualized embedding for a given cluster—for example in order to give more weight to more general terms within a given cluster. Thus, relevancy scores (such as e.g., TextRank scores) may comprise or include generality scores such as the WGIs described herein. In one example, WGIs may be used instead of, e.g., TextRank scores for weighting different entities within a cluster. In another example, WGIs may be combined TextRank scores, e.g., such that TextRank scores may be normalized using WGIs, or vice versa—e.g., in a manner similar to that demonstrated herein with regard to normalizing affinity values using WGIs. In this context, one skilled in the art may recognize that various normalization or weighting formulas may be used in different embodiments of the invention.

Those skilled in the art would recognize that additional embodiments of the invention may be considered or realized in various example contexts and scenarios where the calculation of generality or relevance of words and/or entities may be considered or incorporated into clustering protocols and procedures as predetermined conditions or criteria, for example to form a hierarchical, multi-tiered taxonomy as described herein.

In some embodiments, word relevancy or generality metrics or values of the preferences or thresholds input to a clustering procedure or algorithm may be further normalized, weighted or scaled, e.g., based on values or elements included in the affinity or connectivity matrices and/or a plurality of arithmetic operations. Conversely, similarity, affinity or connectivity matrix values may be scaled or normalized based on word generality metrics or values. In some embodiments, constraint or conditions applied to, for example, statistical parameters derived from WGI scores or related metrics such as, e.g., a median WGI score or the range of all calculated WGI scores, may be input as the preference of each word to a clustering procedure. In one example, the interval or range [MIN-WGI, MAX-WGI] for clustered entities may be used as a normalization or scaling factor S in, e.g., (1/S) (affinity_value)—which may normalize affinity values to account for more or less clusters as part of a particular clustering procedure. Similar scaling or normalization procedures may be introduced, e.g., to scale WGI scores based on affinity or similarity values, and alternative or additional such procedures may be used in different embodiments of the invention.

Similarly, in some embodiments of the invention, WGI scores may be normalized and used as probabilistic factors for choosing an exemplar. For example, in a cluster including terms A, B, C, and given WGI (A)=0.8. WGI (B)=0.7. and WGI (C)=0.5, the probabilities of choosing term A as an exemplar for the cluster by the AP algorithm may be P (A)=0.8/(0.8+0.7+0.5)=40%, and the corresponding probabilities for terms B and C may be P (B)=35%, and P (C)=25%.

Figure 4:
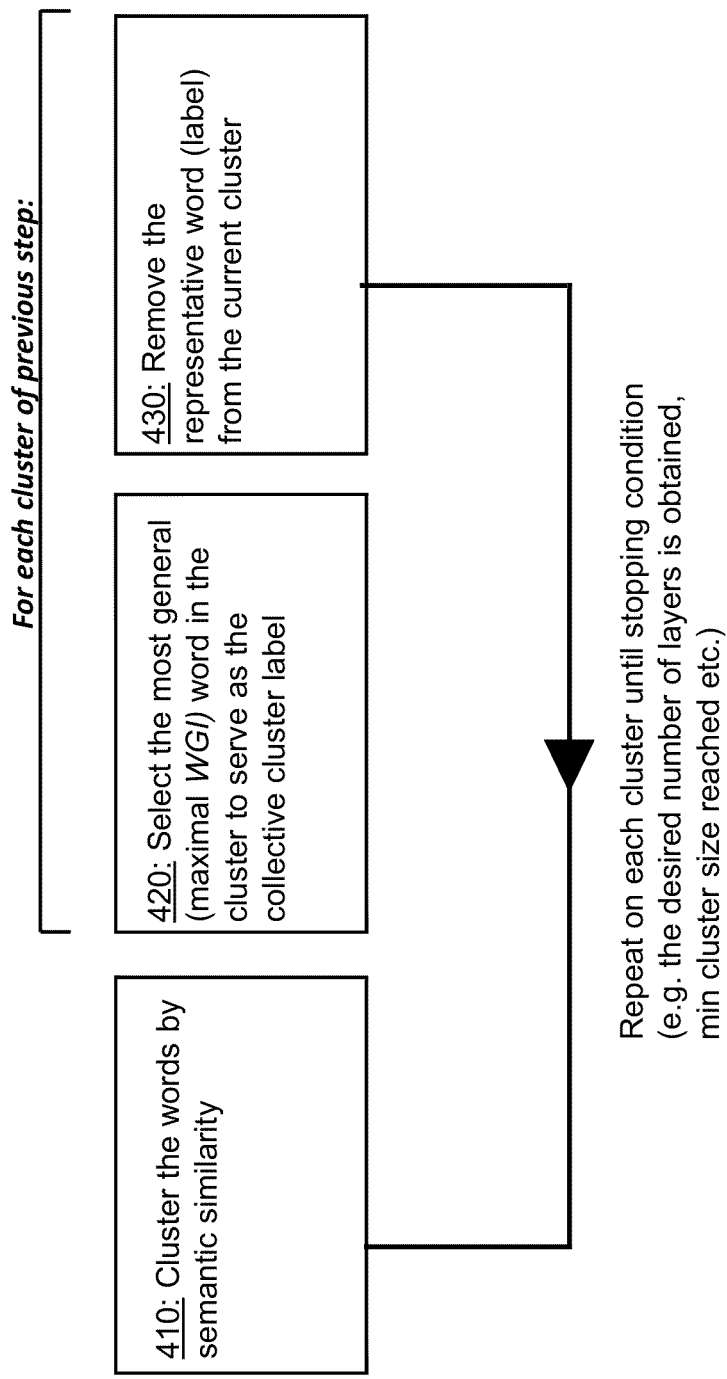
FIG. 4 illustrates an example clustering procedure incorporating word generality indices according to some embodiments of the invention.

FIG. 4 illustrates an example clustering procedure incorporating word generality indices according to some embodiments of the invention. In step 410, entities, terms or words may be clustered based on semantic similarity, e.g., as may be calculated based on a vector embedding model as described herein. Words or entities within a cluster may then be selected and identified as representative of the cluster based on WGI scores or indices, to serve as cluster labels, titles, or names: for example, the word within a cluster for which the highest WGI is calculated may be chosen by some embodiments of the invention as a label, title or name for that cluster (step 420). The chosen or selected entities or words may subsequently be removed from the cluster which they were chosen to represent (step 430). In some embodiments of the invention, entities or words chosen as titles may not be removed and thus remain as members of the cluster.

In another example, exemplars or cluster labels may only be removed before further clustering a given cluster into sub-clusters so that it may not reappear again in a lower level of the hierarchy. For example, given 'internet' as the exemplar of the cluster including: {internet, speed, download, upload} then 'internet' may be removed when breaking this cluster into sub-clusters {speed} and {download, upload}. Each exemplar/label may thus appear in one level in the hierarchy, and it may be removed such that the next most general terms in the cluster (e.g., having the next highest WGI scores) may then serve as the exemplars of the sub-clusters, e.g., in subsequent level in the hierarchy.

In some embodiments of the invention, affinity matrix values and WGI scores may be input simultaneously as a priori conditions into a clustering algorithm (such as, e.g., the AP algorithm), which may then determine, on the basis of both inputs, both which terms are to serve as exemplars and which terms should be clustered together (e.g., such that each term is simply clustered together with its nearest exemplar). For example, embodiments may for example first normalize or scale WGI scores by affinity matrix values as described herein, then select exemplars based on normalized or scaled WGI scores, and then cluster each of the remaining words with the exemplar closest or most similar to it. In other words, each term may be clustered or linked with its nearest exemplar (which can be used, e.g., as a cluster title as described herein).

Figure 5:
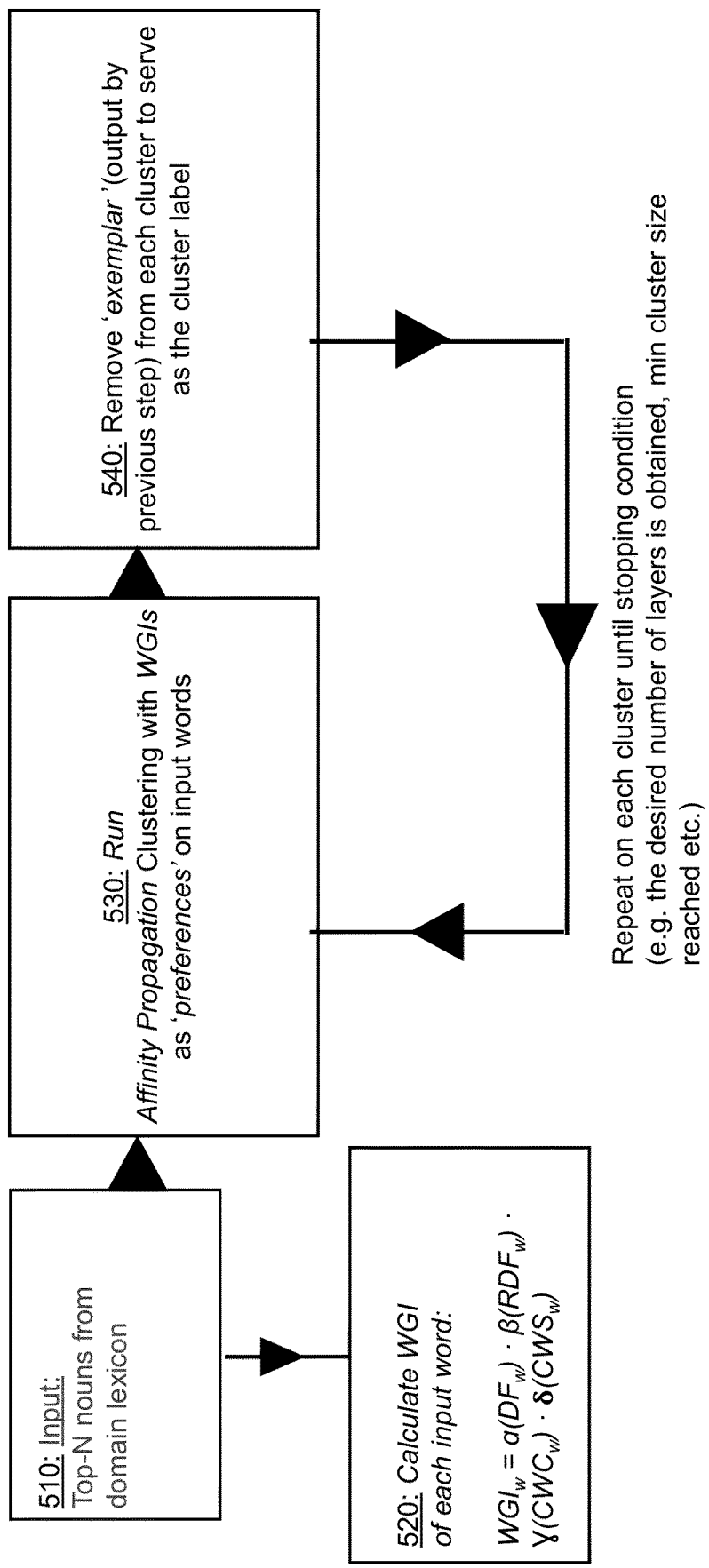
FIG. 5 depicts an example affinity-propagation-based word clustering algorithm incorporating word generality indices according to some embodiments of the invention.

FIG. 5 depicts an example affinity-propagation-based word clustering algorithm incorporating word generality indices according to some embodiments of the invention. In step 510, a plurality of words or terms may be input to the algorithm. Input words may be, for example, the N nouns (e.g., where N=50) appearing the largest number of times in a given domain lexicon (which may include for example thousands of documents). WGIs may then be calculated for each of the input words, for example according to Eq. 4 (step 520). An AP clustering procedure may then be executed on the input words while using or employing calculated WGIs as clustering "preferences" (step 530). In one example, the AP procedure may include normalizing or scaling calculated WGI scores using affinity matrix values as described herein. In another example, the clustering procedure or algorithm may refrain from including, in the same cluster, two or more words for which a WGI higher than a predetermined threshold was calculated. In yet another example, the algorithm may only cluster together a plurality of words if and only if the average WGI calculated based on the WGIs for all words under consideration is below a predetermined threshold, or in between two such thresholds. Different conditions and criteria, as well as quantitative and statistical parameters, may be used in different embodiments of the invention, and such conditions may also be applied to underlying indices such as for example the DF, CWC, CWS, and RDF considered herein. As part of step 530, words may be chosen as "exemplars" or identified as representative of a given cluster as described herein (for example an exemplar being the word having a scaled WGI score above a predetermined threshold). Each of the remaining words or terms may then be clustered or linked with the exemplar closest to them, and exemplars may subsequently be removed from the cluster and serve as a cluster titles or labels as described herein (step 540). One skilled in the art would recognize that different steps, workflows and clustering techniques may be used in different procedures and/or algorithms according to different embodiments of the invention.

Methods, procedures, and approaches provided herein may be combined with various additional techniques and procedures, such as for example, different clustering algorithms and associated techniques (which may include, for example, both "soft" and "hard" clustering approaches—see further discussion regarding soft clustering herein) to provide different embodiments of the invention.

In some cases, it may be desirable to allow at least some entities or words to belong to more than one category or cluster (in one example, "News" in FIG. 2 may for example be allowed to belong to at least two distinct clusters in tier 230, e.g., one including "TV" and "Channel" and another including "CNN" and "FOX"). Some embodiments of the invention may provide protocols and procedures for soft clustering of nodes, such as for example a contextual soft clustering (CSC) protocol as described herein—where at least some nodes may be clustered under more than one exemplar and/or belong to more than one topic or cluster.

Embodiments of the invention may score, order or rank a plurality of nodes and select, filter, or extract nodes based on the scoring or ranking—where, e.g., each node may be or include an entity, a plurality of entities, and/or a cluster of entities (which may be referred to as an "initial" cluster as it may be, e.g., received as input for a clustering procedure or iteration, and/or further clustered with additional entities or clusters in subsequent cluster iterations). For example, the generality or relevance of a plurality of words in a given document or corpus of documents may be calculated or measured, e.g., based on or using relevancy or generality scores as described herein. Terms or words found relevant based on relevancy or generality scores may be further filtered, e.g., by removing a predetermined list of common and "uninteresting" "stop-words" (which may include, for example, words or terms such as "and", "or", "the"; and the like).

In some embodiments the remaining terms may be ranked or scored once more (using, e.g., similar or different generality and/or relevancy scores), and terms having a score or rank below a predetermined threshold may be further removed (and/or terms having a score or rank above a threshold may be chosen or selected). In some embodiments, such a threshold may for example be defined with reference to mean and standard deviation of calculated scores or ranks (such as for example demonstrated herein for connectivity threshold T), as well as to additional or alternative statistical parameters describing a data point, a cluster, a plurality of data points and/or clusters, or the entire dataset or corpus of documents or words. In some embodiments, a word for which a very low score or rank was calculated (e.g., below a second predetermined threshold) may be considered an outlier and, for example, be removed from subsequent clustering iterations as further described herein.

Embodiments may cluster selected, filtered, or extracted nodes into clusters (which may be referred to as "final clusters", e.g., in case they may be output from a clustering protocol—or as "intermediate clusters", e.g., in case they are further used in subsequent clustering iterations and may not be output from the protocol). In some embodiments of the invention, clusters may be organized in levels Ln, such that e.g., L0 denotes un-clustered entities and Ln denotes the highest level in a hierarchy or clusters or tiers, which may include a plurality of entities and/or clusters (e.g., as shown in FIGS. 2-3) as may be included in or provided at a given clustering iteration.

In some embodiments of the invention, an input set of words or terms (such as, e.g., a set of general or relevant terms selected, extracted or filtered from a corpus or plurality of documents based on ranking and/or relevancy or generality scores) may be clustered to produce level 1 (L1) clusters or nodes. In some embodiments, a ranking procedure (which may for example include calculating relevancy and/or generality scores as described herein) may then be executed once more on each L1 cluster or node. Based on calculated scores or ranks, the highest ranked word or term (or possibly a plurality of the highest ranked terms) may, for example, be selected or determined as an "exemplar", cluster title, name or label for the L1 cluster in which it is included based on the calculated relevancy or generality scores, such as for example described herein.

Vector representations or embeddings (such as for example described herein) may be calculated for a plurality of intermediate (such as, e.g., L1) clusters, for example, based on vector representations of their constituent points or entities. In one example, a "combined embedding" may be calculated as the centroid of a plurality of embeddings for nodes within an L1 cluster.

Embodiments may calculate a plurality of weights for nodes within an intermediate cluster (such as for example an L1 cluster) and calculate a combined embedding for the intermediate cluster based on the weights. For example, relevancy and/or generality scores may be used for weighting L1 nodes, e.g., such that the more relevant or general node may have greater weight in determining a centroid or a combined embedding for a constituting L1 cluster. When calculating or determining a centroid for an L1 cluster based on constituent vector embeddings for L1 nodes, a formula such as, for example, $$V_x = \frac{\sum_{n=1}^{N} c_n v_x(n)}{N}$$

may be used for calculating a weighted centroid, where $V_x$ denotes a component x within a combined vector embedding V, and $$\sum_{n=1}^{N} c_n v_x(n)$$

denotes the sum of components x within N constituent vectors v(n) (which may for example describe L1 nodes) weighted by corresponding coefficients $c_n$. In some embodiments, a centroid may be calculated based on calculated ranks or scores for L1 nodes, such that, e.g., ranks or scores are used as the coefficients $c_n$ (for example, maximum rank may used for setting as $c_{max}=1.5$ for the highest ranked node, and subsequent ranks may be used for settings subsequent $c_n$ in diminishing order, e.g., $c_{max-1}=0.9$, $c_{max-2}=0.8$, and so forth), although different formulas and weighting approaches and protocols may be used in different embodiments of the invention.

In some embodiments, a centroid and/or weights may be calculated using, or based on, a selected exemplar or cluster title (which may be, e.g., the most relevant or general word within an L1 cluster, and may thus be assigned a maximal weight or coefficient such as, e.g., $c_{max}$ herein). A combined embedding may, in some embodiments, represent an intermediate cluster, e.g., such that similarities or distances of entities or nodes from the cluster are calculated based on the combined embedding.

In some embodiments, relevancy or generality scores or ranks may be implemented in or incorporated into an appropriate, dedicated vector embedding model (e.g., as components, fields or attributes considered by a Word2Vec model as described herein), which may provide or output a semantically sensitive vector embedding (such as, e.g., a combined embedding) for a given node or cluster based on, e.g., its constituting nodes, terms or words, as well as their features or attributes. In this context, a Word2Vec model used for producing combined embeddings may, in some embodiments, be different than the model used for producing embeddings for individual entities.

Once combined embeddings are calculated for a given L1 cluster, additional embeddings describing a plurality of additional nodes (such as, e.g., entities or words not included in a given L1 cluster) may be calculated by some embodiments of the invention, for example, using the same embedding model used for producing combined L1 cluster embeddings.

Embodiments may cluster a plurality of unselected nodes (such as for example nodes not included in L1 clusters and/or not selected or filtered for producing L1 clusters) and one or more intermediate clusters into subsequent, additional or alternative clusters (which may for example be or constitute final clusters) based on calculated distances or similarity scores. In some embodiments, the clustering of unselected nodes may include adding at least one of the unselected nodes to at least two of the intermediate clusters, or generally including one node in two or more clusters.

For example, based on the plurality of resulting embeddings and calculated or measured distances between them, nodes (which may be, for example additional entities, terms, or words for example included in the corpus of documents from which L1 nodes were extracted and unincluded in the L1 clusters formed) may be found semantically similar to different L1 clusters or nodes—e.g., according to a plurality of maximum distance, similarity or dissimilarity thresholds from the corresponding embedding of a given L1 cluster (which may be for example a combined embedding as described herein). For example, embeddings for nodes found below a predetermined distance or similarity threshold such as, e.g., $T=0.9$ (where the distance may be calculated, e.g., using Eq. 1) from an embedding for a given L1 cluster may be determined semantically similar to that node or cluster.

For example, let C1 be an L1 cluster among n L1 clusters (where n may be an integer), and let the set Sims(C1) be the set of terms similar to C1. C1 and Sims(C1) may be described using vector embeddings or combined embeddings as described herein. A given node or word $w \in$ Sims(C1) may be filtered or removed from Sims(C1), for example, based on comparisons of a similarity score $S(w, C1)$ to similarity scores $S(w, Cn)$, e.g., requiring $n \neq 1$. In some embodiments, if $S(w,C1) < \lambda \cdot S(w,Cn)$—where $\lambda$ may be a flexibility or "softness" weight or parameter (set, e.g., to $\lambda=0.9$)—w may be omitted or removed from Sims(C1) for being comparatively more similar or relevant to cluster Cn. In some other embodiments, a similarity condition or criterion such as for example $S(w,C1) < \lambda \cdot \text{MaxS}(w,Cn)$ may be used, where MaxS(w,Cn) may be the highest similarity score calculated for w and the cluster to which it was found the most similar. It should thus be noted that in some embodiments of the invention, and apart from being included in Sims(C1), a node or word w may also be included in, e.g., an additional group Sims(C2) of terms semantically similar to cluster C2—for example based on the $\lambda$ weighted distance or similarity-based conditions or criteria described herein. Thus, w may be found similar to more than one cluster, and $\lambda$ as considered herein may be set or modified to allow desirable clustering softness, or selectivity, in including node or word w in a given cluster and/or in a plurality of different clusters. Alternative determinations and procedures for including or filtering terms from a given cluster or from a plurality of clusters, incorporating different conditions and criteria, may be used in different embodiments of the invention.

In some embodiments, before or after clustering a given node or word included in Sims(C1), the embedding of each node or word w in Sims(C1) may first be further combined with, or contextualized by, the combined embedding calculated for the relevant L1 cluster—such that, e.g., a contextualized embedding for w may be received. Such contextualized embedding may be used for describing a context of a word within a cluster. For example, given a cluster C1 which may be labeled, e.g., as 'Account Details', then an embedding of the word 'password' included in Sims(C1) may be contextualized according to or based on the combined embedding describing C1, instead of simply being taken as the original word embedding of 'password', which may for example have been produced independently from different clustering iterations and/or using a different Word2vec model. This may be desirable, for example, in case where the original word embedding of 'password' may also refer to the semantic notion of 'wifi passwords', which may be contextualized differently as belonging to a different L1 cluster C2, which may for example labeled as 'Internet'—rather than as belonging to C1 labeled as "Account Details". In such manner, different embeddings may describe a word or term outside and inside a given cluster, and thus in the context of a given topic.

Once similar terms have been found for each L1 node or cluster (such as, e.g., based on similarity scores for contextualized embeddings as described herein), embodiments may further cluster a plurality of L1 clusters with nodes similar to them, to form or create level 2 (L2) clusters. L2 cluster may reflect or describe, for example, another tier or level of hierarchy which may be different (and, for example, higher—e.g., in the sense clusters in tier 220 may be more inclusive and "loose" than those in tier 230) than that described by L1 clusters. In this context, for example, embodiments of the invention may iteratively repeat a plurality of actions and operations such as for example the ranking of nodes, selecting nodes, clustering selected nodes (e.g., into a cluster of level Ln), calculating distances between nodes (e.g., between selected or clustered Ln nodes and nodes unselected or unincluded in Ln), and clustering unselected nodes and/or intermediate clusters (such as e.g., Ln clusters), and perform additional repetitions or iterations, e.g., until appropriate criteria are met to stop the clustering procedure or protocol such that final clusters (e.g., Ln+1 clusters) may be formed and provided. In some embodiments, stop conditions or criteria may be or may based on, for example: a maximum cluster size (e.g., the procedure may stop, and final clusters may be received, when at least one cluster including X entities is formed), and/or a maximum number of calculated distances below a predetermined threshold (e.g., the procedure may stop if at least X calculated distances or similarity scores between nodes or clusters are below a threshold T). The repeating of iterations may, in some embodiments, take place until one or more criteria such as, e.g., described herein are met. In some embodiments, each clustering iteration may include placing clusters (such as, e.g., final clusters, or clusters received following the specific iteration considered) in a tier above, or higher than previously received clusters (such as for example illustrated in FIGS. 2-3; in this context, for illustration purposes, one may consider, e.g., tier 310 as including final clusters labeled or titled "Internet" and "TV" in a tier higher than tier 320 of intermediate clusters, e.g., labeled or titled "Speed", "Channel", and "Display"). Thus, some embodiments may automatically generate a multi-tiered taxonomy, including a plurality of clusters and cluster titles from one or more clustering iterations, which may be organized in a hierarchical structure as discussed herein.

Figure 9:
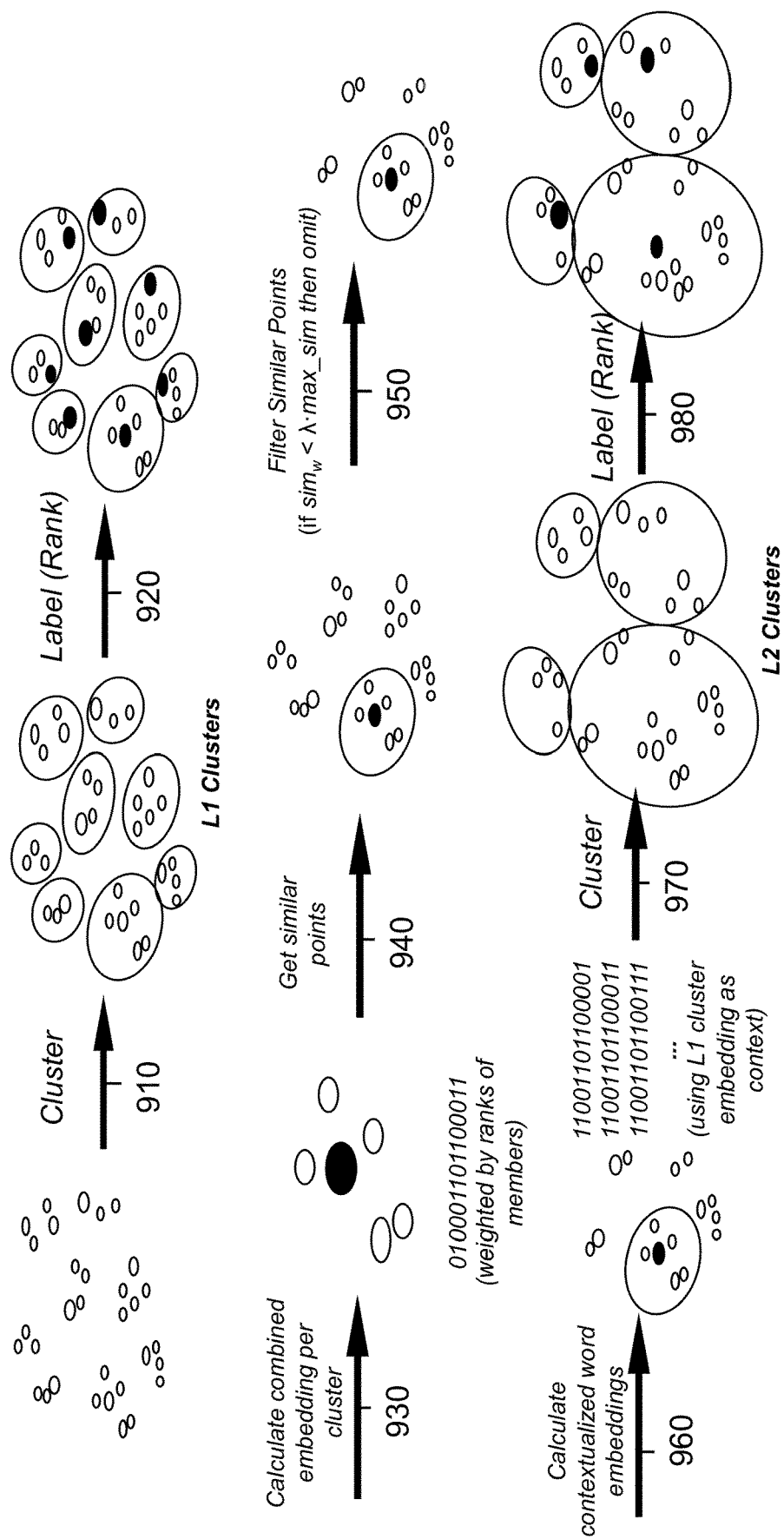
FIG. 9 depicts an example contextual soft clustering (CSC) algorithm according to some embodiments of the invention.

FIG. 9 depicts an example contextual soft clustering (CSC) algorithm according to some embodiments of the invention. In step 910, an input set of nodes or entities, which may be for example words or terms extracted or filtered from a corpus of documents, may be clustered to produce L1 clusters (e.g., based on relevancy or generality scores, and/or using an appropriate clustering procedure or algorithm such as for example an AP procedure modified to include some or all of the calculations, procedures, principles, conditions, and criteria described herein). Nodes within each L1 cluster may then be ranked (e.g., again using generality or relevancy scores) and a cluster name or label may be selected according to the ranking (step 920). Combined embeddings may then be calculated for the resulting clusters, e.g., based on underlying node embeddings and ranks calculated for them (step 930). Similar nodes that may be found within a short distance from a given combined embedding for a cluster, or that may be found within a predetermined threshold applied to a similarity score (which may be calculated, e.g., using Eq. 1) may then be selected or filtered, while remaining words or terms may be removed (step 940). An additional filtering step, e.g., to remove words from a clustering operation may take place, including, e.g., a comparison of the similarity of a node or word w to a given cluster with a similarity to another, different cluster (for example according to S(w,C1)<λ·MaxS(w,Cn) as described herein; step 950). A plurality of contextualized vector embeddings may then be calculated for the nodes selected or filtered as similar to L1 clusters (for example, a different contextualized embedding may be calculated to describe different contexts of a word w within each cluster to which it has been found similar; step 960). L1 clusters may then be grouped or clustered together with the corresponding (e.g., contextualized) similar nodes to produce L2 clusters (step 970). Nodes within each L2 cluster may be ranked once more (e.g., as in step 920) and a cluster name or label may once more be selected according to the ranking (step 980). In some embodiments, the ordering of some steps, such as for example steps 960 and 970, may be changed or reversed. Those skilled in the art may recognize that additional or alternative steps, including for example additional screening and/or scoring steps, may be included in various contextual clustering procedures according to different embodiments of the invention.

In some embodiments of the invention, a similar sequence of operations including, e.g., some or all of: ranking relevant nodes (based on, e.g., generality and/or relevance scores applied to vector embeddings for the relevant entities); finding, filtering or selecting general or relevant nodes, terms, entities, or clusters (e.g., using predetermined thresholds such as for example described herein); labeling clusters, e.g., based on ranks; producing combined embeddings describing clusters and/or contextualized embeddings describing underlying words and/or subclusters; measuring or calculating inter entity or cluster/word distances or scores; and clustering based on calculated scores or distances, may be performed in an iterative manner—such as for example on L2 clusters to form L3 clusters, then L4 clusters, and so forth—which may result in a multi-tiered taxonomy such as, e.g., described herein, in which a given node or word may be attributed or included in a plurality of clusters and considered to have a different and/or unique context within each cluster to which it belongs.

In some embodiments, some clustering steps—such as for example steps 910, 940, and 970—may involve or include storing calculated pairwise similarity scores between pairs nodes in an affinity matrix (which may be for example a matrix such as demonstrated in Table 1). In some embodiments, scores describing contextualized and/or combined embeddings may be stored in affinity matrices separate from, e.g., an affinity matrix describing non-contextualized or non-combined embeddings describing single nodes. Different data structures and/or formats may be used in different embodiments of the invention.

Some clustering operations such as for example described in FIG. 9 may thus include or involve conditions or criteria involving affinity matrix values, such as for example requiring that in order to be considered similar to a given word or cluster C1, a given node or word w must have similarity scores or affinity values higher than a threshold T1 (e.g., T1=0.9) with reference to C1 and lower than a threshold T2 (e.g., T2=0.7) with reference to a plurality of other nodes or clusters within Cn. Other conditions and criteria including or involving such affinity values and/or matrix may be used in different embodiments of the invention.

In some embodiments, various clustering steps and iterations may be performed using an "ensemble clustering" protocol, for example in order to ensure or verify quality standards including, e.g., stability and robustness of the overall clustering procedure and, accordingly, of a taxonomy which may result from it.

Some embodiments of the invention may generate a co-cluster matrix describing clustering results based on a plurality of executed protocols. As part of such ensemble clustering protocol, a plurality of (e.g., different) clustering protocols, algorithms or procedures may be executed, for example, on the same input set of entities. Various different input configurations and clustering conditions and criteria may be used or included in each of the executed protocols, and a co-cluster matrix or table describing different clustering results—describing, for example, how frequently each pair of nodes get clustered together (e.g., using two or more different clustering protocols and/or input configurations)—may be generated or constructed. Such co-cluster matrix may itself serve as a source of additional clustering conditions or criteria in different, e.g., subsequent clustering protocols and/or iterations. An example co-cluster matrix may be seen in Table 3:

TABLE 3

| N(P) = 10 | W1 | W2 | W3 |
|---|---|---|---|
| W1 | 1.00 | 0.10 | 0.5 |
| W2 | 0.10 | 1.00 | 0.10 |
| W3 | 0.5 | 0.10 | 1.00 |

Where N(P) denotes the number of clustering protocols and/or attempts executed and/or described in the co-cluster matrix (which may include for example a plurality of different or separate clustering procedures such as, e.g., described herein, where each may include or involve, for example, using different vector embedding models, similarity scores, and the like), Wn denotes the plurality of different nodes or words considered in the procedures, and where a numeric value at each cell may describe a percentage of clustering procedures in which two words or nodes are clustered together. For example, a numeric value of 0.10 may indicate that a first word W1 has been included in a cluster with a second word W2 in one tenth all clustering procedures executed or attempted (e.g., in 1 out of N(P)=10; the fact that a value of 1.00 is given for a word W1 being clustered with itself is thus trivial). In some embodiments, different co-cluster matrices may be used for describing different levels or hierarchies of clusters, such as for example L1 or L2 clusters as described herein. Additional or alternative co-cluster matrix formats may be used in different embodiments of the invention.

In some embodiments of the invention, a plurality of clustering operations may be performed based on a co-cluster matrix. Once generated, a co-clustering matrix may be used in a manner analogous to, or in combination with, an affinity matrix (and/or a connectivity matrix), or with a plurality of affinity (and/or connectivity matrices), for example, to produce a hybrid affinity matrix—from which a final or updated ensemble clustering result may be drawn or derived. In some embodiments of the invention, a hybrid affinity matrix may be a multiplication product of affinity and co-clustering matrices (which may, e.g., be weighted or scaled). For example, a co-cluster matrix M1 may be scaled by a factor & while an affinity matrix M2 may be scaled by a complementary factor 1-δ, to produce a hybrid affinity matrix M3 according to, e.g., $M3=\varepsilon M1 \cdot (1-\varepsilon)M2$. Other weighting, scaling, or normalizing procedures may be used in different embodiments of the invention.

Figure 10:
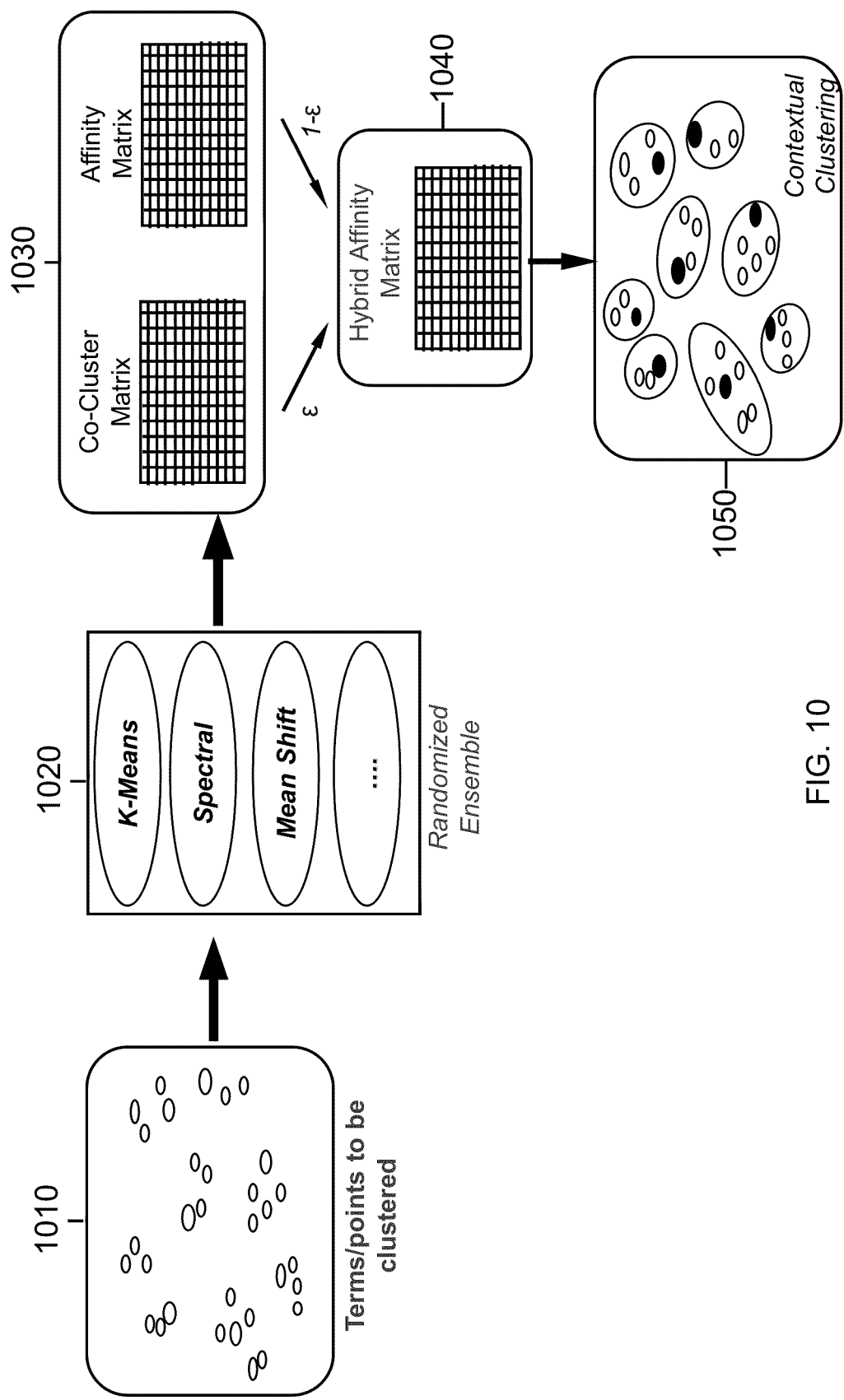
FIG. 10 shows an example ensemble clustering protocol according to some embodiments of the invention.

FIG. 10 shows an example ensemble clustering protocol according to some embodiments of the invention. In step 1010, a set of nodes, entities or points, (which may for example be, or be extracted or derived from, a corpus of documents and/or a lexicon of words of terms) may be given as input. A plurality of clustering procedures or protocols, including for example, K-means, Spectral, and Mean Shift based clustering techniques, may be performed or executed on the input provided (step 1020). In some embodiments of the invention, each clustering protocol may for example include the generating of vector representations or embeddings for the input entities by an appropriate vector embedding model (such as a Word2Vec model as described herein), while in other embodiments such generating may take place before the execution of a given clustering protocol, and different protocols may use a single embedding model. Some embodiments of the invention may include or involve executing a plurality clustering protocols on a plurality of variations on the input set to be clustered, for example where variation sets may be generated using another (e.g., separate) vector embedding model producing embeddings different from a previously used embedding model. A co-cluster matrix and an affinity matrix may then be calculated based on, e.g., executed clustering procedures or iterations (step 1030). For example, in some embodiments of the invention, an affinity matrix (such as for example illustrated in Table 1) may be calculated based on vector embeddings calculated by a default vector embedding model and a corresponding pairwise similarity formula (such as for example provided in Eq. 1), while a co-cluster matrix may include, inter alia, results of different clustering protocols which may, e.g., include or involve using different vector embedding models and/or similarity formulas. Co-cluster and affinity matrices may then be combined to produce a hybrid affinity matrix (using for example a scaling factor & on affinity and co-cluster matrices such as for example provided in Tables 1 and 3, and as discussed herein; step 1040), which may for example encapsulate or describe a plurality clustering and/or similarity calculation results and from which a final clustering result may be drawn or derived (step 1050)—which may, for example, include context-related semantic information involving, e.g., cluster labels and/or contextualized embeddings as described herein.

In some embodiments of the invention, different affinity and/or connectivity and/or co-cluster and/or hybrid affinity matrices may be calculated for different clustering procedures or iterations executed and/or included in the ensemble clustering protocol, and/or for a plurality of different clustering iterations within such procedures—and a plurality of such matrices may be considered in an ensemble clustering protocol such as for example illustrated in FIG. 10.

A combination of clustering conditions or criteria derived from, e.g., the co-cluster and affinity matrices may thus be used in some or all of a plurality of clustering iterations and as part of various clustering protocols, procedures and algorithms according to different embodiments of the invention, which may be used for example to provide or produce a hierarchical, multi-tiered taxonomy as described herein.

One skilled in the art would recognize that some or all of the techniques, protocols, and procedures discussed herein, e.g., with regard to soft clustering or to ensemble clustering (such as for example illustrated in FIGS. 9-10) may be for example implemented as conditions and/or constraints and/or parameters and/or processing operations integrated with existing clustering protocols and procedures, such as the AP protocol described herein, or in additional or alternative protocols and procedures in different embodiments of the invention.

Additional/alternative embodiments of the invention may use or employ a generated taxonomy as part of various computer-based procedures and protocols, including, but not limited to, additional and/or different entity clustering and classification procedures, search protocols, and the like.

In some embodiments of the invention, additional entities may be received following the calculation of vector representations for entities or nodes (e.g., by a Word2vec model), and/or following the clustering of at least some nodes or entities as described herein. In such embodiments, the additional entities may themselves be clustered (e.g., separately from the previously clustered entities) based on preceding calculations and/or clustering operations. For example, once a domain taxonomy such as for example the one depicted in FIG. 3 has been calculated, embodiments of the invention may receive a plurality of documents as additional entities. Embodiments may then search the contents of the received documents for terms included in the taxonomy, and for example group or cluster documents including the terms "Fox" and "CNN" in a single group, e.g., even if none of the documents contains any terms such as "News", "Channel", and the like. Those skilled in the art would recognize many additional or alternative examples in which embodiments of the invention may use or utilize past calculations and/or past clustering results to, e.g., separately cluster or categorize subsequent, additionally received entities. In particular, similar embodiments may be used in the context of a contact center as further discussed herein.

In another example, a plurality of search results for an input query may be provided by embodiments of the invention based on a generated taxonomy or corresponding vector representations for a plurality of entities or terms. For instance, embodiments may receive "Fox" as an input query, search a database or corpus of documents and find no documents containing the term "Fox". However, based on a taxonomy such as the one depicted in FIG. 3, embodiments may further search for documents containing the terms "CNN" and "CNBC", which were previously represented and/or clustered as similar to "Fox" (in the context of media providers), and provide such documents as search results for the input query. In this context, similarly to word or term extraction techniques and protocols, various search procedures which may be included or used in some embodiments of the invention are known in the art.

Various outputs such as e.g., clusters, and taxonomies produced or provided by embodiments of the invention may be stored in various formats, such as for example tables, graph databases, JSON files, and the like. Those skilled in the art would recognize that various data formats may allow or enable, e.g., clustering additional, newly received entities based on a previously generated taxonomy, or providing search results based on such taxonomy as described herein.

Two sets of clustering results shown herein may illustrate how embodiments of the invention, using approaches, techniques and procedures as described herein, may improve the quality of hierarchical clustering—for example in the context of creating a domain taxonomy. For example, given a plurality of input entities such as a corpus of documents containing a plurality of words, systems and methods based on, for example, the standard AP clustering procedure may result in the following output groups or clusters:

bill, payment, balance, statement, total, mail
charge, fee, cost
connection, signal, network, setting, wire, wireless, test
customer, loyalty
credit, card, debit, digit, social
home, house
password, store, id, application, user, reference
information, access, update, detail, info, record
internet, speed, basic, data
message, screen, text, error, page
equipment, modem, device, router
name, list, family
order, approval
phone, line, mobile, security, computer, port
plan, package, price, offer, promotion, tax, discount, rate, contract, deal, bundle
button, power, light, remote, control, voice, program, movie
support, department, agent, representative, supervisor technician, appointment
tv, box, cable, channel, stream, room, video, play, address, code, zip, area, apartment, city, location, verification In contrast, a clustering procedure incorporating some or all of the techniques, protocols and constraints provided herein may result, for example, in the following output:

name, information, password, user, id, list, family, address, code, area, zip, apartment, error, location, city, digit, verification, social, info
customer, support, department, store, agent, representative, supervisor, record, loyalty, reference
bill, charge, payment, order, credit, card, balance, statement, total, debit, approval, mail, page
plan, package, fee, price, offer, tax, promotion, detail, discount, rate, contract, cost, deal, bundle
device, equipment, modem, access, technician, signal, update, power, light, network, appointment, setting, wire, router, wireless, test
internet, connection, home, speed, basic, data
tv, box, cable, channel, remote, button, screen, stream, control, program, video, room, voice, play, movie
phone, line, mobile, message, text, security, computer, port, application where words in bold may be for example be chosen as cluster titles, labels or exemplars as discussed herein and may thus be selected to, e.g., as representative of a given cluster. Accordingly, clusters may be merged or organized in a hierarchical manner, to form a domain taxonomy such as, e.g., the example taxonomy depicted in FIG. 3.

It should be noted that in some embodiments of the invention, exemplars may be removed from the cluster they are chosen to represent or describe, while in other embodiments exemplars may be kept as entities or nodes within the relevant cluster.

Terms, clusters, and taxonomies produced or provided by embodiments of the invention may be displayed in an appropriate format and/or visualization such as, e.g., a graph, a report, and the like.

Figure 6:
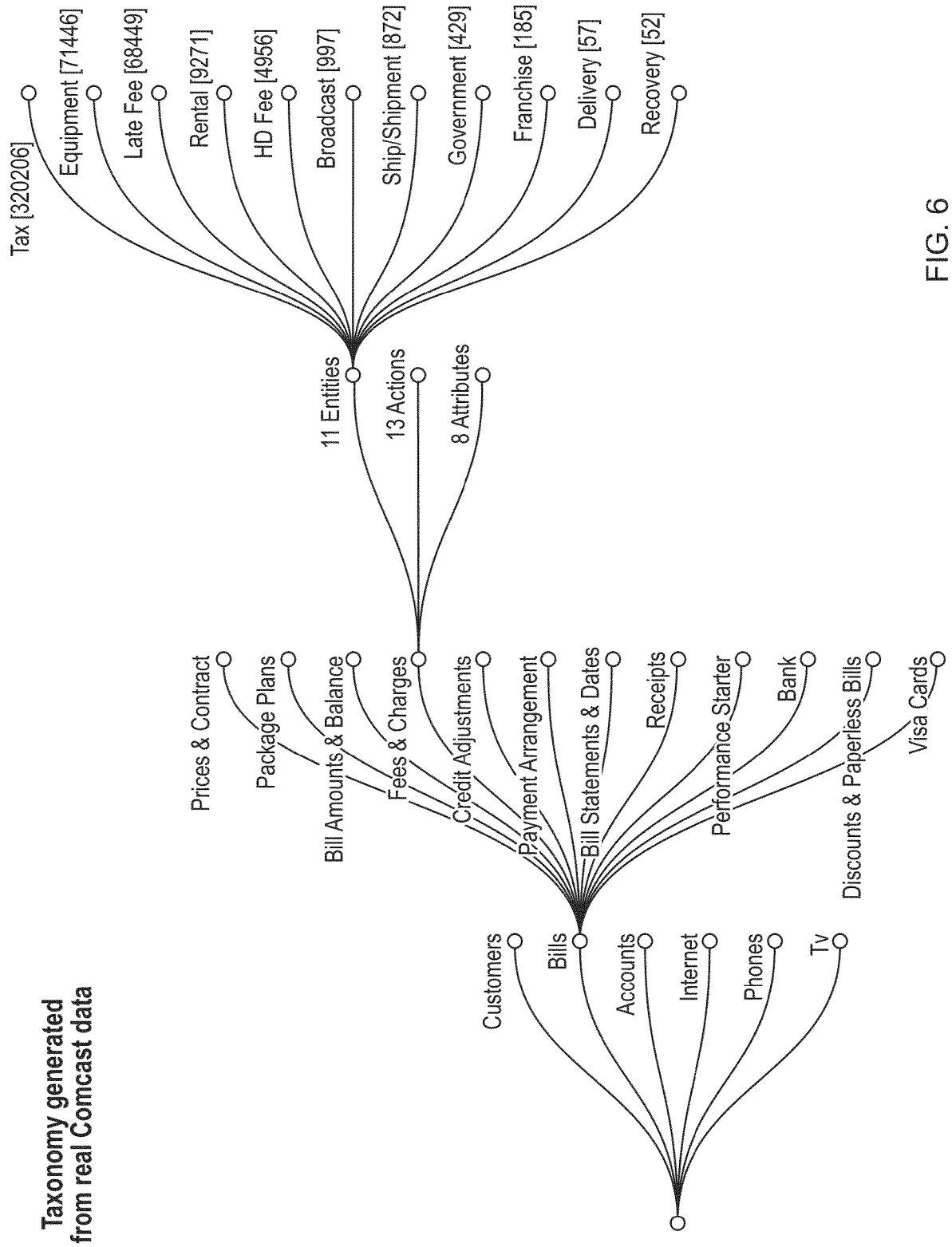
FIG. 6 is an example visualization of an automatically generated, hierarchical domain taxonomy that may be generated using some embodiments of the invention.

FIG. 6 is an example visualization of an automatically generated, hierarchical domain taxonomy that may be generated using some embodiments of the invention. It may be seen that clusters may include additional clusters in a hierarchical manner-which may be achieved based on word generality or relevance scores as calculated or quantified by embodiments of the invention, as well as for example based on the various clustering protocols discussed herein. In some embodiments, visualizations may be included in reports, which may be sent to various parties of interest such as for example a supervisor responsible or interested in tracking or monitoring. e.g., contact center activity (see additional discussions regarding some example uses of taxonomies in contact center environments herein). It should be noted that other visualization types and frameworks may be used in different embodiments of the invention.

Taxonomies produced by embodiments of the invention may be used in organizations such as call centers, which may create and/or document and/or store "interactions", which may be represented e.g., as transcripts. Such interactions data and/or corresponding transcripts may be or may describe conversations or data exchanged between, typically, an agent or representative (typically human) of the company and a customer. Interactions may include, for example, voice, audio or video recordings of conversations, and/or other data such as text, e-mail or instant messaging exchanges. Interactions may be converted from one format to another, and may include more than one different format of data: e.g. an interaction may include an audio conversation and/or a text version of that conversation created by for example automatic speech recognition (ASR). Text versions of interactions may be stored and searched.

Figure 7:
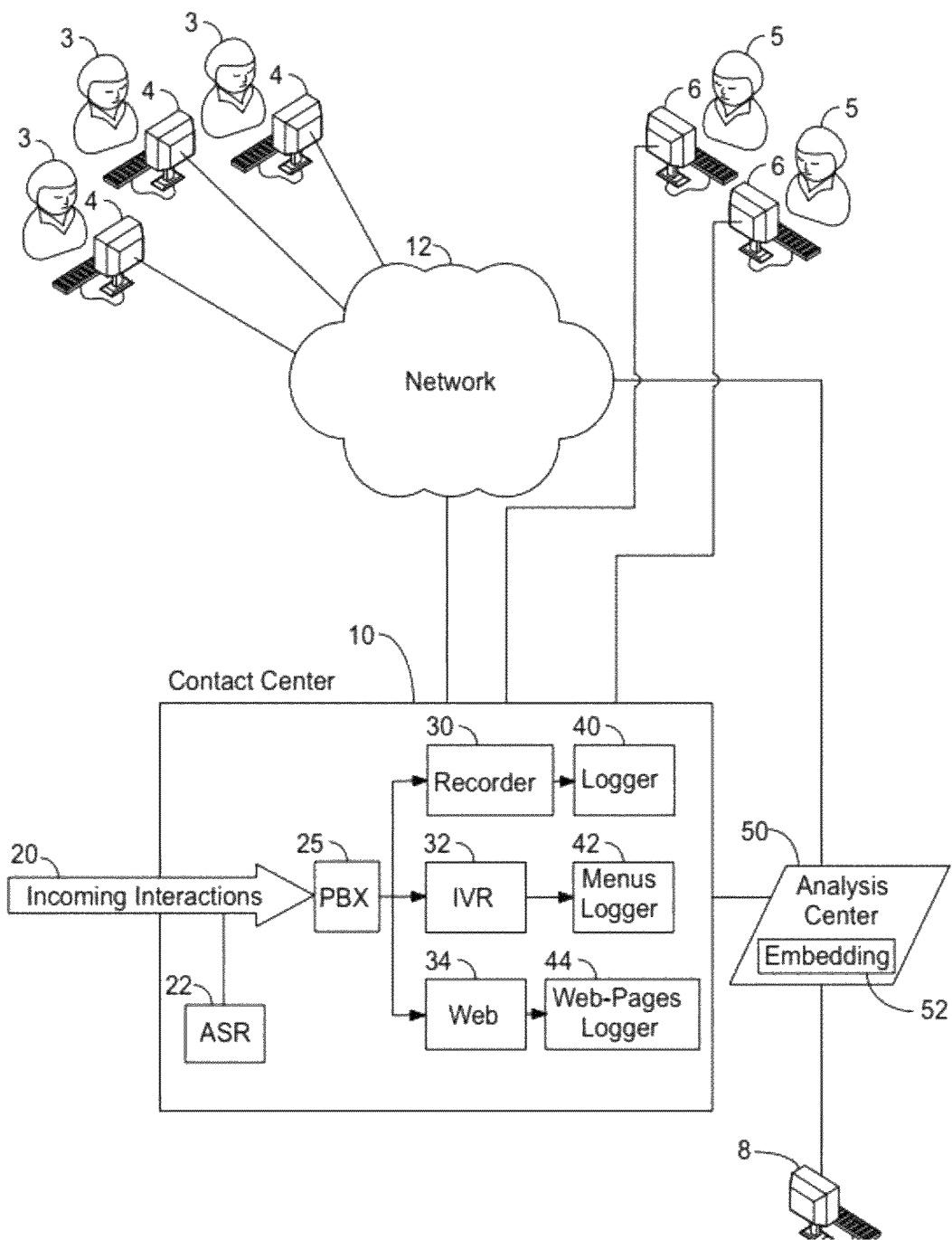
FIG. 7 is a block diagram of remotely connected computer systems according to some embodiments of the present invention.

FIG. 7 is a block diagram of remotely connected computer systems according to some embodiments of the present invention. While FIG. 7 shows such a system in the context of a contact center, embodiments of the invention may be used in other contexts. Incoming interactions 20 (e.g. conversations, telephone calls, interactive voice response interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. Incoming interactions 20 may be pre-processed and may enter the system as text data, or may be converted to text via ASR module 22.

User equipment 4, agent terminals 6 and user terminals 8 may include computing or telecommunications devices such as personal computers or other desktop computers, conventional telephones, cellular telephones, portable or tablet computers, smart or "dumb" terminals, etc., and may include some or all of the components such as a processor shown in FIG. 1.

Interaction data or documents may be stored, e.g., in files and/or databases. For example, logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10.

Analysis center 50 may perform functions such as those shown in FIGS. 2-6 and 8-13 herein, and may include for example embedding module 52, which may for example include the Word2vec model and related clustering operations discussed herein. Analysis center 50 may communicate with one or more user terminals 8 to for example provide visualizations (such as for example the one provided in FIG. 6).

One or more networks 12 may connect equipment or modules not physically co-located, for example connecting external user equipment 4 to contact center 10, and contact center 10 to analysis center 50 and agent terminals 6. Agent terminals 6 may thus be physically remote from user equipment 4. Networks 12 may include for example telephone networks, the Internet, or other networks. While in FIG. 7 contact center 10 is shown passing data to analysis center 50, these modules may communicate via a network such as networks 12.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 7 is not limiting and may include any blocks and infrastructure needed to handle voice, text (SMS (short message service), WhatsApp messages, chats, etc.) video and any type of interaction with costumers.

Each of modules and equipment such as contact center 10, ASR module 22 PBX 25, IVR block 32, voice interactions block or recorder 30, menus logger 42, connect API 34, analysis center 50, external user equipment 4, and agent terminals 6, user terminals 8 and other modules discussed herein may be or include a computing device such as included in FIG. 1, although various units among these modules may be combined into one computing device. Agent terminals 6 and user equipment 4 may be remote or physically separate computer systems communicating and/or connected over network 12.

Some embodiments of the invention may be used, for example, to organize or categorize a corpus or plurality of documents describing, e.g., interactions between customers/users and agents in a call or contact center or in a plurality of call centers. For example, hundreds of customer interactions handled by a wide variety of call centers belonging to multiple, different industries, may automatically be organized and/or sorted by embodiments of the invention into corresponding taxonomies, which may include a wide range of words and terms describing, for example, various different products, customer reported issues, and use-cases.

Additionally or alternatively, interactions may be categorized, sorted, or associated among themselves according to, or based on, a previously generated taxonomy. In this context, different protocols and procedure may be used in different embodiments of the invention—such as for example ones demonstrated herein for receiving and clustering additional entities following the previous calculations or clustering procedures. Additional steps or repetitions of steps such as, e.g., extracting words from documents, calculating generality scores or metrics, selecting nodes as exemplars, and clustering nodes under the selected exemplars may also be introduced for the interactions under consideration. In another example, once a taxonomy has been built or has been previously generated, a vector embedding model (which may be, e.g., different from the model already used for generating vector embeddings for words and/or documents in a given domain, as described herein) may subsequently be used by some embodiments to create contextualized, semantic embedding vectors of each word or term in the context of the generated taxonomy—for example by combining or concatenating embeddings describing related words, or words pertaining to the same cluster. One skilled in the art would recognize, however, that different procedures and protocols for categorizing interactions may be performed by different embodiments of the invention based on previously executed clustering operations and previously generated taxonomies.

Figure 8:
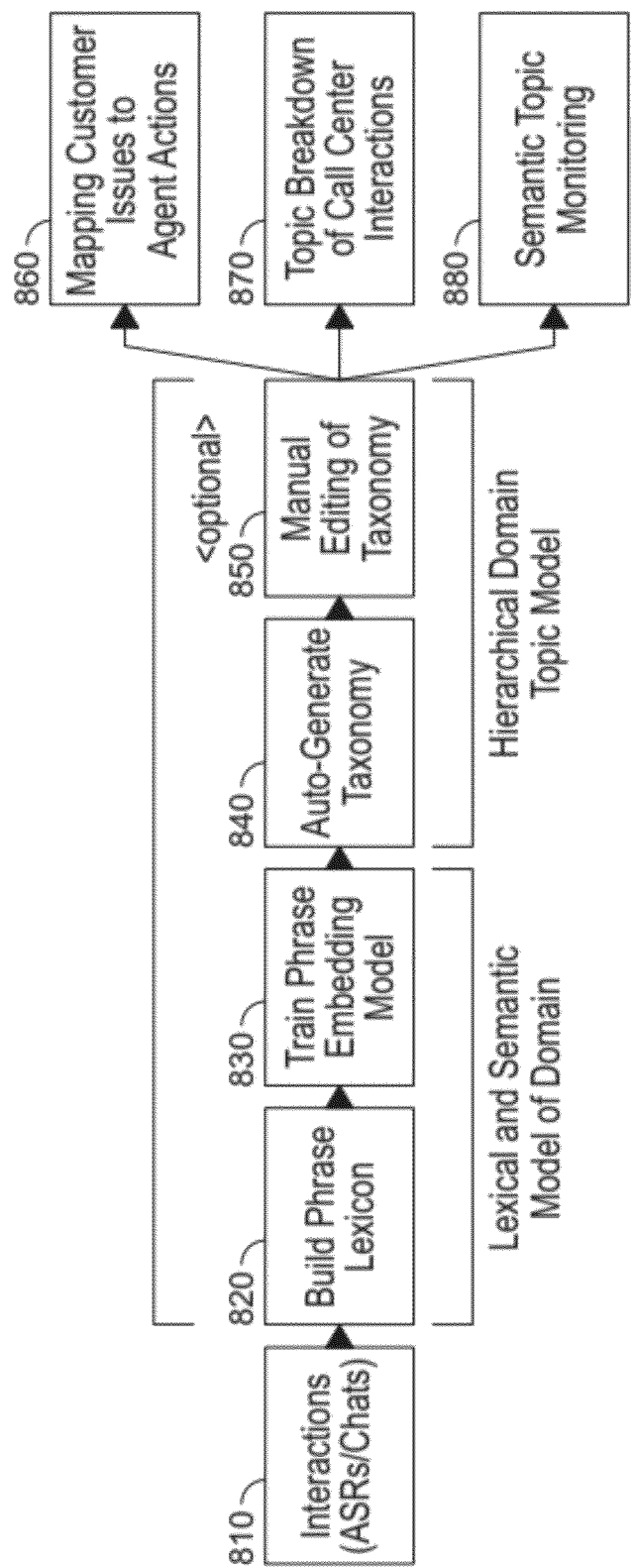
FIG. 8 is a high-level flow diagram illustrating an example procedure for organizing call center interactions according to a taxonomy established by some embodiments of the invention.

FIG. 8 is a flow diagram depicting an example procedure for organizing call center interactions according to a taxonomy established by some embodiments of the invention. In step 810, interactions are stored after being executed in the call center (such as a multi-component call center system as, e.g., depicted in FIG. 7). By extracting terms or words from the interactions, a domain lexicon may subsequently be built (step 820). A word, phrase or document vector embedding model (such as for example a Word2vec model as described herein) may be trained based on the resulting lexicon (step 830). A taxonomy may then be automatically generated according to the protocols and procedures described herein (step 840). Optionally, a user may subsequently edit the generated taxonomy, for example in order to modify the automatically generated clustering or grouping of terms according to user preferences (step 850).

Using a taxonomy generated according to some or all of the principles and procedures outlined herein, any given call, or part of an interaction (such as for example particular phrases, parts of a conversation, etc.) may automatically be indexed, sorted or decomposed into its main topics, keywords, and the like. Some embodiments of the invention may further group various other words or entities into the various topics and sub-topics in the taxonomy. For example, particular user-reported issues, e.g., in a technical support call, may be categorized alongside their commonly associated agent responses, based on words or terms included in the call and the corresponding taxonomy (step 860). In addition, by grouping or aggregating words from different interactions, which may be for example associated with different (e.g., unrelated) call centers and/or industries, an overall statistical summary of words or terms which may be recognized as related topics and/or reported issues—as well as of their respective proportions—may be built or constructed (step 870). In addition, embodiments of the invention may further monitor trends, or perform semantic topic monitoring in incoming interactions or calls, e.g., based on or according to a generated taxonomy and/or corresponding historic calculations and clustering procedure (step 880). In such manner, embodiments of the invention may offer insight into interaction trends relating to, e.g., what user or customer reported issues are most statistically common, and as to shifts in and changes in such commonly reported issues over periods of time (which may be performed, in some embodiments, by comparing past calculations and/or scores and/or clustering results and/or taxonomies to one another).

In some embodiments of the invention, contact center activity—such as for example the routing of interactions from users 3 to agents 5 by PBX 25, the recording of interactions by recorder 34, and the like—may be modified, altered or optimized (for example, dynamically, in real time) according to, or performed based on, a generated taxonomy. For example, a contact center system (such as for example the depicted in FIG. 7) may be configured to route incoming interactions to particular agents based on the agents' expertise or skills matching topics included or associated with the incoming interaction. This may be done, e.g., in case a previously generated taxonomy associates the agents' skill (which may, e.g., be extracted from agent records, where various skills may be stored as keywords associated with a given agent ID) with incoming interaction topics. Such association may take place, for example, based on the words describing the topic and the agent's skills having been clustered under the same exemplar in a given taxonomy. Additionally or alternatively, the system may, be configured to record more/less interactions within a given timeframe where a particular topic or issue is clustered under a particular exemplar which may be, e.g., manually labeled as less important according to storage space saving considerations. In this context, different techniques of extracting agent skills and interaction topics or skills and topics with appropriate keywords may be used in different embodiments of the invention. One skilled in the art would recognize that alternative utilizations of taxonomies in the context of contact center interactions may be offered by different embodiments of the invention.

Embodiments of the invention improve call center and interaction routing technology by providing an effective and semantically sensitive approach for automatically categorizing interactions, which further enables dynamic optimization and management of contact center activity—such as the routing of interactions based on frequently reported topics and subtopics. Those skilled in the art would recognize that similar or equivalent improvements may be offered by embodiments of the invention in contexts, systems, and environments different from those associated with a call or contact center. Embodiments more generally offer an improvement to clustering procedures and approaches by allowing the automatic organization of clustered entities (including, but not limited to, words, phrases and terms) in complex and informative structures, which may be hierarchical and/or multi-tiered as described herein, while having desirable semantically significant and statistically robust qualities (as reflected, for example, in the differences between the relationship and hierarchy among tiers 210, 220, and 230 in FIG. 2, and those among tiers 310, 320, 330, 340 in FIG. 3 as described herein, the differences being associated with some of the technological improvements offered by some embodiments of the invention).

Figure 11:
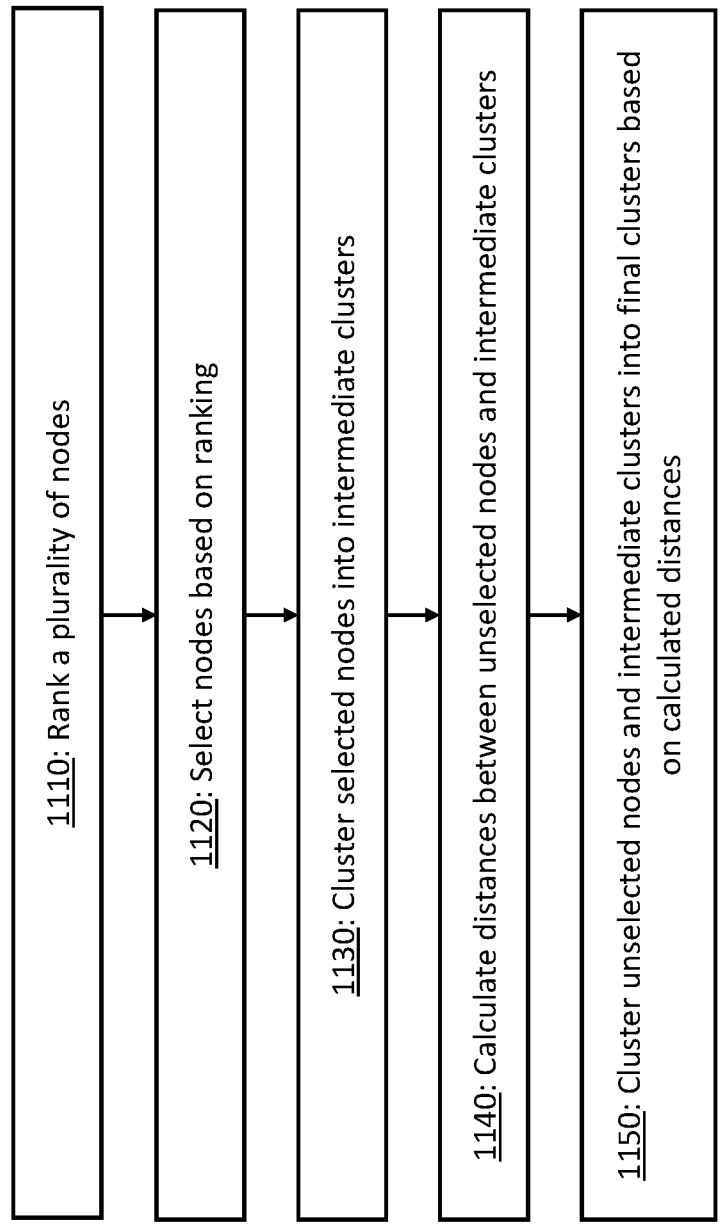
FIG. 11 is a flow diagram illustrating an example method for an automatic clustering of nodes according to some embodiments of the invention.

FIG. 11 is a flow diagram illustrating an example method for an automatic clustering of nodes according to some embodiments of the invention. In step 1110, embodiments may rank a plurality of nodes, where, e.g., each node may include an entity or an initial cluster of entities. For example, the nodes may be ordered based on relevancy and/or generality scores such as, e.g., described herein. Embodiments may then select nodes based on the ranking (step 1120) and cluster selected nodes into intermediate clusters (step 1130). Embodiments may then calculate distances or similarities between unselected nodes (e.g., nodes not selected in step 1120) and intermediate clusters (step 1140) and cluster unselected nodes and intermediate clusters into final clusters, e.g., based on the calculated distances (step 1150).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed:

1. A method of clustering nodes, the method comprising:
   ranking, by a computer processor, a plurality of nodes, each of the nodes comprising either an entity or an initial cluster of entities;
   selecting, by the processor, one or more of the nodes based on the ranking;
   clustering, by the processor, one or more of the selected nodes into intermediate clusters;
   calculating, by the processor, one or more distances between one or more unselected nodes and one or more of the intermediate clusters;
   clustering, by the processor, one or more of the unselected nodes and one or more of the intermediate clusters into final clusters based on one or more the calculated distances.

2. The method of claim 1, comprising:
   calculating, by the processor, one or more weights for one or more nodes within a given intermediate cluster;
   calculating, by a vector embedding model, an embedding for the intermediate cluster based on one or more of the weights; and
   wherein the calculating of one or more distances is performed based on the calculated embedding.

3. The method of claim 2, comprising:
   calculating, by the processor, relevancy scores for one or more of the nodes within the intermediate cluster;
   selecting, by the processor, one or more of the nodes within the intermediate cluster as a cluster title based on the calculated relevancy scores; and
   wherein the calculating of one or more weights is performed based on the selected cluster title.

4. The method of claim 3, wherein at least one of: the ranking of a plurality of nodes, and the calculating of relevancy scores comprise using one or more generality indicators, the indicators describing a distance from one or more of the entities to one or more joint-entities.

5. The method of claim 1, wherein the clustering of one or more of the unselected nodes comprises adding at least one of the unselected nodes to at least two of the intermediate clusters.

6. The method of claim 1, comprising:
   iteratively repeating the ranking of a plurality of nodes, the selecting of one or more of the nodes, the clustering of one or more of the selected nodes, the calculating of one or more distances, and the clustering of one or more of the unselected nodes to form the final clusters, the repeating taking place until one or more criteria are met, wherein the criteria are based on at least one of: a maximum cluster size, and a maximum number of calculated distances below a predetermined threshold, wherein each iteration comprises placing, by the processor, each final cluster in a tier below one of the intermediate clusters; and
   automatically generating, by the processor, a taxonomy comprising one or more of the clusters and the titles from one or more iterations, the taxonomy organized in a hierarchical structure.

7. The method of claim 1, wherein one or more clustering operations are performed using a plurality of different clustering protocols and input configurations, and wherein the method comprises:
   generating, by the processor, a co-cluster matrix, the matrix describing results based on two or more of the protocols and configurations; and
   wherein at least one clustering operation is performed based on the co-cluster matrix.

8. The method of claim 1, wherein one or more of the entities include one or more words extracted from one or more documents.

9. A computerized system for clustering nodes, the system comprising:
   a memory storing instructions,
   and a computer processor executing instructions to:
      rank a plurality of nodes, each of the nodes comprising either an entity or an initial cluster of entities;
      select one or more of the nodes based on the ranking;
      cluster one or more of the selected nodes into intermediate clusters;
      calculate one or more distances between one or more unselected nodes and one or more of the intermediate clusters;
      cluster one or more of the unselected nodes and one or more of the intermediate clusters into final clusters based on one or more the calculated distances.

10. The computerized system of claim 9, wherein the processor executes instructions to:
    calculate one or more weights for one or more nodes within a given intermediate cluster:
       calculate, by a vector embedding model, an embedding for the intermediate cluster based on one or more of the weights; and
       wherein the calculating of one or more distances is performed based on the calculated embedding.

11. The computerized system of claim 10, wherein the processor executes instructions to:
    calculate relevancy scores for one or more of the nodes within the intermediate cluster;
    select one or more of the nodes within the intermediate cluster as a cluster title based on the calculated relevancy scores; and
    wherein the calculating of one or more weights is performed based on the selected cluster title.

12. The computerized system of claim 11, wherein at least one of: the ranking of a plurality of nodes, and the calculating of relevancy scores comprise using one or more generality indicators, the indicators describing a distance from one or more of the entities to one or more joint-entities.

13. The computerized system of claim 9, wherein the clustering of one or more of the unselected nodes comprises adding at least one of the unselected nodes to at least two of the intermediate clusters.

14. The computerized system of claim 9 wherein the processor executes instructions to:
    iteratively repeat the ranking of a plurality of nodes, the selecting of one or more of the nodes, the clustering of one or more of the selected nodes, the calculating of one or more distances, and the clustering of one or more of the unselected nodes to form the final clusters, the repeating taking place until one or more criteria are met, wherein the criteria are based on at least one of: a maximum cluster size, and a maximum number of calculated distances below a predetermined threshold, wherein each iteration comprises placing, by the processor, each final cluster in a tier higher than the intermediate clusters; and
    automatically generate a taxonomy comprising one or more of the clusters and the titles from one or more iterations, the taxonomy organized in a hierarchical structure.

15. The computerized system of claim 9, one or more clustering operations are performed using a plurality of different clustering protocols and input configurations, and wherein the processor is to:

generate a co-cluster matrix, the matrix describing results based on two or more of the protocols and configurations; and wherein at least one clustering operation is performed based on the co-cluster matrix.

16. The computerized system of claim 9, wherein one or more of the entities include one or more words extracted from one or more documents.

17. A method for categorizing interactions using an automatically generated taxonomy, the method comprising:
  in a computerized-system comprising a processor, and a memory including a data store of a plurality of documents, and connected by a network to one or more remote computers:
    extracting a plurality of words from the documents;
    ranking, by the processor, a plurality of nodes, each of the nodes comprising either a word of the plurality of words or an initial cluster of words of the plurality of words:
    selecting, by the processor, one or more of the nodes based on the ranking;
    clustering, by the processor, one or more of the selected nodes into intermediate clusters:
    calculating, by the processor, one or more distances between one or more unselected nodes and one or more of the intermediate clusters;
    clustering, by the processor, one or more of the unselected nodes and one or more of the intermediate clusters into final clusters based on one or more the calculated distances;
    iteratively repeating the ranking of a plurality of nodes, the selecting of one or more of the nodes, the clustering of one or more of the selected nodes, the calculating of one or more distances, and the clustering of one or more of the unselected nodes to form the final clusters, the repeating taking place until one or more criteria are met, wherein each iteration comprises placing, by the processor, each final cluster in a tier higher than the intermediate clusters, and wherein the criteria are based on at least one of: a maximum cluster size, and a maximum number of calculated distances below a predetermined threshold; and
    automatically generating, by the processor, a taxonomy comprising one or more of the clusters from one or more iterations, the taxonomy organized in a hierarchical structure.

18. The method of claim 17, comprising:
  providing a plurality of search results for an input query based on the taxonomy.

19. The method of claim 17, wherein one or more of the documents describe one or more interactions, the interactions routed using a private branch exchange to one or more of the remote computers.

20. The method of claim 19, comprising: routing, by the private branch exchange, one or more of the interactions to one or more of the remote computers based on the taxonomy.

* * * * *

UNITED STATES PATENT AND TRADEMARK OFFICE
CERTIFICATE OF CORRECTION

| | | |
|---|---|---|
| PATENT NO. | : 12,287,821 B2 | Page 1 of 1 |
| APPLICATION NO. | : 18/460803 | |
| DATED | : April 29, 2025 | |
| INVENTOR(S) | : Stephen Lauber | |

It is certified that error appears in the above-identified patent and that said Letters Patent is hereby corrected as shown below:

On the Title Page

Add item (60) Related U.S. Application Data stating:
-- Provisional Patent Application No. 63/433,272, filed on Dec. 16, 2022 --

Signed and Sealed this
Twenty-eighth Day of October, 2025

John A. Squires
*Director of the United States Patent and Trademark Office*